(12) United States Patent
Helferich

(10) Patent No.: US 8,116,743 B2
(45) Date of Patent: Feb. 14, 2012

(54) SYSTEMS AND METHODS FOR DOWNLOADING INFORMATION TO A MOBILE DEVICE

(75) Inventor: Richard J. Helferich, Encinitas, CA (US)

(73) Assignee: Wireless Science, LLC, Chatsworth, CA (US)

( * ) Notice: Subject to any disclaimer, the term of this patent is extended or adjusted under 35 U.S.C. 154(b) by 352 days.

(21) Appl. No.: 11/598,832

(22) Filed: Nov. 14, 2006

(65) Prior Publication Data

US 2007/0178887 A1    Aug. 2, 2007

Related U.S. Application Data

(63) Continuation of application No. 11/108,759, filed on Apr. 19, 2005, now Pat. No. 7,146,157, which is a continuation of application No. 09/513,998, filed on Feb. 23, 2000, now Pat. No. 6,983,138, which is a continuation of application No. 08/989,874, filed on Dec. 12, 1997, now Pat. No. 6,097,941.

(51) Int. Cl.
*H04M 11/10* (2006.01)

(52) U.S. Cl. ............. 455/413; 455/412.1; 455/412.2; 455/466; 379/88.11; 379/88.12

(58) Field of Classification Search ............ 455/412.1
See application file for complete search history.

(56) References Cited

U.S. PATENT DOCUMENTS

| | | | |
|---|---|---|---|
| 2,003,576 A | 6/1935 | Buhren | |
| 3,118,145 A | 1/1964 | Nee | |
| 3,794,983 A | 2/1974 | Sahin | |
| 4,039,761 A | 8/1977 | Nicoud et al. | |
| 4,042,906 A | 8/1977 | Ezell | |
| 4,124,773 A | 11/1978 | Elkins | |
| 4,371,752 A | 2/1983 | Matthews et al. | |
| 4,412,217 A | 10/1983 | Willard et al. | |

(Continued)

FOREIGN PATENT DOCUMENTS

EP    324650    7/1989

(Continued)

OTHER PUBLICATIONS

Micheal M. Tao, et al., "Always On, Always Connected Mobile Computing," IEEE (1996).

(Continued)

*Primary Examiner* — Charles Appiah
*Assistant Examiner* — Mazda Sabouri
(74) *Attorney, Agent, or Firm* — Law Offices of Steven G. Lisa, Ltd.; Jon E. Kappes, Esq.; James D. Busch, Esq.

(57) ABSTRACT

Devices, systems and processes for accessing and management of voice and other messages. Such devices, systems and processes employ an interface which allows the user to access and manage messages on his or her user device and, furthermore, automatically to access and manage messages on remote devices via radio frequency link. These interfaces may present users with intuitive and direct options for accessing and managing voice mail, such as, for instance, to push a designated forward button when the user desires to forward a voice mail. Such common interfaces promote more efficient and effective use and management of messaging resources because they among other things eliminate the requirement to be conversant in different interfaces, rules and protocols for the different platforms on which messages may be accessed and managed.

6 Claims, 9 Drawing Sheets

U.S. PATENT DOCUMENTS

| | | |
|---|---|---|
| 4,468,813 A | 8/1984 | Burke et al. |
| 4,480,253 A | 10/1984 | Anderson |
| 4,495,647 A | 1/1985 | Burke et al. |
| 4,549,047 A | 10/1985 | Brian et al. |
| 4,573,140 A | 2/1986 | Szeto |
| 4,602,129 A | 7/1986 | Matthews et al. |
| 4,640,991 A | 2/1987 | Matthews et al. |
| 4,644,352 A | 2/1987 | Fujii |
| 4,654,713 A | 3/1987 | Boucharlat et al. |
| 4,710,955 A | 12/1987 | Kauffman |
| 4,713,837 A | 12/1987 | Gordon |
| 4,737,979 A | 4/1988 | Hashimoto |
| 4,769,641 A | 9/1988 | Yoshizawa et al. |
| 4,769,642 A | 9/1988 | Davis et al. |
| 4,786,902 A | 11/1988 | Davis et al. |
| 4,807,155 A | 2/1989 | Cree et al. |
| 4,811,376 A | 3/1989 | Davis et al. |
| 4,812,843 A | 3/1989 | Champion, III et al. |
| 4,821,308 A | 4/1989 | Hashimoto |
| 4,825,456 A | 4/1989 | Rosenberg |
| 4,837,798 A | 6/1989 | Cohen et al. |
| 4,837,800 A | 6/1989 | Freeburg et al. |
| 4,839,734 A | 6/1989 | Takemura |
| 4,845,491 A | 7/1989 | Fascenda et al. |
| 4,853,688 A | 8/1989 | Andros et al. |
| 4,858,232 A | 8/1989 | Diaz et al. |
| 4,864,301 A | 9/1989 | Helferich |
| 4,868,560 A | 9/1989 | Oliwa et al. |
| 4,873,520 A | 10/1989 | Fisch et al. |
| 4,885,577 A | 12/1989 | Nelson |
| 4,897,835 A | 1/1990 | Gaskill et al. |
| 4,905,003 A | 2/1990 | Helferich |
| 4,916,737 A | 4/1990 | Chomet et al. |
| 4,942,598 A | 7/1990 | Davis |
| 4,949,143 A | 8/1990 | Iesaka et al. |
| 4,961,216 A | 10/1990 | Baehr et al. |
| 4,965,569 A | 10/1990 | Bennett et al. |
| 4,975,694 A | 12/1990 | McLaughlin et al. |
| 5,003,576 A | 3/1991 | Helferich |
| 5,005,013 A | 4/1991 | Tsukamoto et al. |
| 5,007,105 A | 4/1991 | Kudoh et al. |
| 5,029,199 A | 7/1991 | Jones et al. |
| 5,040,204 A | 8/1991 | Sasaki et al. |
| 5,043,721 A | 8/1991 | May |
| 5,047,763 A | 9/1991 | Kuznicki et al. |
| 5,065,423 A | 11/1991 | Gaskill |
| 5,070,536 A | 12/1991 | Mahany et al. |
| 5,093,659 A | 3/1992 | Yamada |
| 5,093,901 A | 3/1992 | Cree et al. |
| 5,115,233 A | 5/1992 | Zdunek et al. |
| 5,117,449 A | 5/1992 | Metroka et al. |
| 5,128,980 A | 7/1992 | Choi |
| 5,128,981 A | 7/1992 | Tsukamoto et al. |
| 5,134,724 A | 7/1992 | Gehring et al. |
| 5,138,311 A | 8/1992 | Weinberg |
| 5,138,312 A | 8/1992 | Tsukamoto et al. |
| 5,140,419 A | 8/1992 | Galumbeck et al. |
| 5,146,612 A | 9/1992 | Grosjean et al. |
| 5,153,903 A | 10/1992 | Eastmond et al. |
| 5,159,331 A | 10/1992 | Park et al. |
| 5,159,592 A | 10/1992 | Perkins |
| 5,159,713 A | 10/1992 | Gaskill et al. |
| 5,173,688 A | 12/1992 | DeLuca et al. |
| 5,175,758 A | 12/1992 | Levanto et al. |
| 5,177,780 A | 1/1993 | Kasper et al. |
| 5,182,553 A | 1/1993 | Kung |
| 5,185,604 A | 2/1993 | Nepple et al. |
| 5,192,947 A | 3/1993 | Neustein |
| 5,194,857 A | 3/1993 | Gomez |
| 5,212,636 A | 5/1993 | Nakazawa |
| 5,220,366 A | 6/1993 | King |
| 5,227,774 A | 7/1993 | Benoist |
| 5,239,466 A | 8/1993 | Morgan et al. |
| 5,239,679 A | 8/1993 | Murai |
| 5,241,305 A | 8/1993 | Fascenda et al. |
| 5,247,700 A | 9/1993 | Wohl et al. |
| 5,249,230 A | 9/1993 | Mihm, Jr. |
| 5,255,305 A | 10/1993 | Sattar |
| 5,257,307 A | 10/1993 | Ise |
| 5,265,033 A | 11/1993 | Vajk et al. |
| 5,283,818 A | 2/1994 | Klausner et al. |
| 5,285,426 A | 2/1994 | Teodoridis |
| 5,285,496 A | 2/1994 | Frank et al. |
| 5,315,635 A | 5/1994 | Kane et al. |
| 5,329,501 A | 7/1994 | Meister et al. |
| 5,329,550 A * | 7/1994 | Rousseau et al. ............. 375/219 |
| 5,333,266 A | 7/1994 | Boaz et al. |
| 5,375,161 A | 12/1994 | Fuller et al. |
| 5,379,031 A | 1/1995 | Mondrosch et al. |
| 5,390,362 A | 2/1995 | Modjeska et al. |
| 5,396,537 A | 3/1995 | Schwendeman |
| 5,396,547 A | 3/1995 | Baals et al. |
| 5,398,021 A | 3/1995 | Moore |
| 5,402,466 A | 3/1995 | Delahanty |
| 5,406,557 A | 4/1995 | Baudoin |
| 5,406,616 A | 4/1995 | Bjorndahl |
| 5,410,302 A | 4/1995 | Dulaney, III et al. |
| 5,418,835 A | 5/1995 | Frohman et al. |
| 5,420,922 A | 5/1995 | Lundblad et al. |
| RE34,976 E | 6/1995 | Helferich et al. |
| 5,426,422 A | 6/1995 | Vanden Heuvel et al. |
| 5,426,594 A | 6/1995 | Wright et al. |
| 5,428,663 A | 6/1995 | Grimes et al. |
| 5,428,784 A | 6/1995 | Cahill, Jr. |
| 5,432,839 A | 7/1995 | DeLuca |
| 5,436,960 A | 7/1995 | Campana, Jr. et al. |
| 5,440,559 A | 8/1995 | Gaskill |
| 5,442,706 A | 8/1995 | Kung |
| 5,444,438 A | 8/1995 | Goldberg |
| 5,444,671 A | 8/1995 | Tschannen et al. |
| 5,448,759 A | 9/1995 | Krebs et al. |
| 5,452,356 A | 9/1995 | Albert |
| 5,455,579 A | 10/1995 | Bennett et al. |
| 5,455,823 A | 10/1995 | Noreen et al. |
| 5,457,732 A | 10/1995 | Goldberg |
| 5,463,382 A | 10/1995 | Nikas et al. |
| 5,463,672 A | 10/1995 | Kage |
| 5,473,143 A | 12/1995 | Vak et al. |
| 5,473,320 A | 12/1995 | DeLuca et al. |
| 5,473,667 A | 12/1995 | Neustein |
| 5,475,653 A | 12/1995 | Yamada et al. |
| 5,475,863 A | 12/1995 | Simpson et al. |
| 5,475,866 A | 12/1995 | Ruthenberg |
| 5,479,378 A | 12/1995 | Yamada et al. |
| 5,479,408 A | 12/1995 | Will |
| 5,479,472 A | 12/1995 | Campana, Jr. et al. |
| 5,481,255 A | 1/1996 | Albert et al. |
| 5,483,352 A | 1/1996 | Fukuyama et al. |
| 5,483,595 A | 1/1996 | Owen |
| 5,485,503 A | 1/1996 | Diem |
| 5,487,100 A | 1/1996 | Kane |
| 5,487,167 A | 1/1996 | Dinallo et al. |
| 5,489,894 A | 2/1996 | Murray |
| 5,493,692 A | 2/1996 | Theimer et al. |
| 5,497,373 A | 3/1996 | Hulen et al. |
| 5,506,886 A | 4/1996 | Maine et al. |
| 5,524,009 A | 6/1996 | Tuutijarvi et al. |
| 5,530,438 A | 6/1996 | Bickham et al. |
| 5,530,930 A | 6/1996 | Hahn |
| 5,544,321 A | 8/1996 | Theimer et al. |
| 5,550,535 A | 8/1996 | Park |
| 5,555,376 A | 9/1996 | Theimer et al. |
| 5,555,446 A | 9/1996 | Jasinski |
| 5,557,606 A | 9/1996 | Moon et al. |
| 5,557,659 A | 9/1996 | Hyde-Thomson |
| 5,557,749 A | 9/1996 | Norris |
| 5,559,800 A | 9/1996 | Mousseau et al. |
| 5,559,862 A | 9/1996 | Bhagat et al. |
| 5,561,702 A | 10/1996 | Lipp et al. |
| 5,564,018 A | 10/1996 | Flores et al. |
| 5,568,540 A | 10/1996 | Greco et al. |
| 5,572,196 A | 11/1996 | Sakumoto et al. |
| 5,572,488 A | 11/1996 | Yamada et al. |
| 5,579,372 A | 11/1996 | Astrom |
| 5,581,366 A | 12/1996 | Merchant et al. |
| 5,581,593 A | 12/1996 | Engelke et al. |
| 5,584,070 A | 12/1996 | Harris et al. |

| | | | | | |
|---|---|---|---|---|---|
| 5,588,009 A | 12/1996 | Will | 5,835,089 A | 11/1998 | Skarbo et al. |
| 5,590,092 A | 12/1996 | Fehnel | 5,838,252 A | 11/1998 | Kikinis |
| 5,592,532 A | 1/1997 | Koizumi | 5,841,837 A | 11/1998 | Fuller et al. |
| 5,600,703 A | 2/1997 | Dang et al. | 5,845,211 A | 12/1998 | Roach, Jr. |
| 5,600,708 A | 2/1997 | Meche et al. | 5,850,594 A | 12/1998 | Cannon et al. |
| 5,603,054 A | 2/1997 | Theimer et al. | 5,857,020 A | 1/1999 | Peterson, Jr. |
| 5,604,788 A | 2/1997 | Tett | 5,862,325 A | 1/1999 | Reed et al. |
| 5,608,446 A | 3/1997 | Carr et al. | 5,864,606 A | 1/1999 | Hanson et al. |
| 5,608,786 A | 3/1997 | Gordon | 5,870,030 A | 2/1999 | DeLuca et al. |
| 5,611,050 A | 3/1997 | Theimer et al. | 5,870,454 A | 2/1999 | Dahlen |
| 5,623,242 A | 4/1997 | Dawson, Jr. et al. | 5,872,779 A | 2/1999 | Vaudreuil |
| 5,625,870 A | 4/1997 | Moon | 5,872,847 A | 2/1999 | Boyle et al. |
| 5,627,525 A | 5/1997 | Kudoh et al. | 5,872,926 A | 2/1999 | Levac et al. |
| 5,627,876 A | 5/1997 | Moon | 5,872,930 A | 2/1999 | Masters et al. |
| 5,630,060 A | 5/1997 | Tang et al. | 5,875,436 A | 2/1999 | Kikinis |
| 5,630,207 A | 5/1997 | Gitlin et al. | 5,878,230 A | 3/1999 | Weber et al. |
| 5,631,635 A | 5/1997 | Robertson | 5,878,351 A | 3/1999 | Alanara et al. |
| 5,631,948 A | 5/1997 | Bartholomew et al. | 5,884,159 A | 3/1999 | Thro et al. |
| 5,633,916 A | 5/1997 | Goldhagen et al. | 5,884,160 A | 3/1999 | Kanazaki |
| 5,635,918 A | 6/1997 | Tett | 5,887,249 A | 3/1999 | Schmid |
| 5,636,265 A | 6/1997 | O'Connell et al. | 5,889,839 A * | 3/1999 | Beyda et al. ............... 379/88.12 |
| 5,638,369 A | 6/1997 | Ayerst et al. | 5,889,852 A | 3/1999 | Rosecrans et al. |
| 5,644,627 A | 7/1997 | Segal et al. | 5,892,909 A | 4/1999 | Grasso et al. |
| 5,649,305 A | 7/1997 | Yoshida | 5,893,032 A | 4/1999 | Maeda et al. |
| 5,652,789 A | 7/1997 | Miner et al. | 5,893,091 A | 4/1999 | Hunt et al. |
| 5,654,942 A | 8/1997 | Akahane | 5,895,471 A | 4/1999 | King et al. |
| 5,661,782 A | 8/1997 | Bartholomew et al. | 5,903,723 A | 5/1999 | Beck et al. |
| 5,663,703 A | 9/1997 | Pearlman et al. | 5,903,845 A | 5/1999 | Buhrmann et al. |
| 5,668,880 A | 9/1997 | Alajajian | 5,905,495 A | 5/1999 | Tanaka et al. |
| 5,675,507 A | 10/1997 | Bobo, II | 5,905,777 A | 5/1999 | Foladare et al. |
| 5,675,627 A | 10/1997 | Yaker | 5,905,865 A | 5/1999 | Palmer et al. |
| 5,678,176 A | 10/1997 | Moon | 5,907,805 A | 5/1999 | Chotai |
| 5,678,179 A | 10/1997 | Turcotte et al. | 5,909,491 A | 6/1999 | Luo |
| 5,680,442 A | 10/1997 | Bartholomew et al. | 5,913,032 A | 6/1999 | Schwartz et al. |
| 5,684,859 A | 11/1997 | Chanroo et al. | 5,918,158 A | 6/1999 | LaPorta et al. |
| 5,694,120 A | 12/1997 | Indekeu et al. | 5,920,826 A | 7/1999 | Metso et al. |
| 5,694,454 A | 12/1997 | Hill et al. | 5,924,016 A | 7/1999 | Fuller et al. |
| 5,696,500 A | 12/1997 | Diem | 5,928,325 A | 7/1999 | Shaughnessy et al. |
| 5,699,053 A | 12/1997 | Jonsson | 5,930,250 A | 7/1999 | Klok et al. |
| 5,703,934 A | 12/1997 | Zicker et al. | 5,930,701 A | 7/1999 | Skog |
| 5,706,211 A | 1/1998 | Beletic et al. | 5,933,478 A | 8/1999 | Ozaki et al. |
| 5,710,816 A | 1/1998 | Stork et al. | 5,936,547 A | 8/1999 | Lund |
| 5,717,742 A | 2/1998 | Hyde-Thomson | 5,938,725 A | 8/1999 | Hara |
| 5,722,071 A | 2/1998 | Berg et al. | 5,943,397 A | 8/1999 | Gabin et al. |
| 5,724,410 A | 3/1998 | Parvulescu et al. | 5,948,059 A | 9/1999 | Woo et al. |
| 5,726,643 A | 3/1998 | Tani | 5,951,638 A | 9/1999 | Hoss et al. |
| 5,737,394 A | 4/1998 | Anderson et al. | 5,958,006 A | 9/1999 | Eggleston et al. |
| 5,737,395 A | 4/1998 | Irribarren | 5,961,590 A | 10/1999 | Mendez et al. |
| 5,737,688 A | 4/1998 | Sakai et al. | 5,961,620 A | 10/1999 | Trent et al. |
| 5,740,230 A | 4/1998 | Vaudreuil | 5,963,618 A | 10/1999 | Porter |
| 5,742,668 A | 4/1998 | Pepe et al. | 5,966,652 A | 10/1999 | Coad et al. |
| 5,745,689 A | 4/1998 | Yeager et al. | 5,974,447 A | 10/1999 | Cannon et al. |
| 5,751,793 A | 5/1998 | Davies et al. | 5,974,449 A | 10/1999 | Chang et al. |
| 5,751,814 A | 5/1998 | Kafri | 5,978,837 A | 11/1999 | Foladare et al. |
| 5,752,191 A | 5/1998 | Fuller et al. | 5,988,857 A | 11/1999 | Ozawa et al. |
| 5,761,622 A | 6/1998 | Priest | 5,991,615 A | 11/1999 | Coppinger et al. |
| 5,768,381 A | 6/1998 | Hawthorne | 5,995,597 A | 11/1999 | Woltz et al. |
| 5,774,803 A | 6/1998 | Kariya | 6,009,173 A | 12/1999 | Sumner |
| 5,778,315 A | 7/1998 | Proietti | 6,014,559 A | 1/2000 | Amin |
| 5,781,857 A | 7/1998 | Hwang et al. | 6,018,654 A | 1/2000 | Valentine et al. |
| 5,787,345 A | 7/1998 | Moon | 6,018,657 A | 1/2000 | Kennedy et al. |
| 5,796,394 A | 8/1998 | Wicks et al. | 6,018,774 A | 1/2000 | Mayle et al. |
| 5,797,091 A | 8/1998 | Clise et al. | 6,021,114 A | 2/2000 | Shaffer et al. |
| 5,802,165 A | 9/1998 | Kim | 6,021,190 A | 2/2000 | Fuller et al. |
| 5,802,466 A | 9/1998 | Gallant et al. | 6,021,433 A | 2/2000 | Payne et al. |
| 5,805,886 A | 9/1998 | Skarbo et al. | 6,026,153 A | 2/2000 | Fuller et al. |
| 5,809,115 A | 9/1998 | Inkinen | 6,026,292 A | 2/2000 | Coppinger et al. |
| 5,809,130 A | 9/1998 | Ayala | 6,029,065 A | 2/2000 | Shah |
| 5,809,413 A | 9/1998 | Meche et al. | 6,029,171 A | 2/2000 | Smiga et al. |
| 5,809,415 A | 9/1998 | Rossmann | 6,032,039 A | 2/2000 | Kaplan |
| 5,809,424 A | 9/1998 | Eizenhoefer | 6,035,104 A | 3/2000 | Zahariev |
| 5,812,639 A | 9/1998 | Bartholomew et al. | 6,044,247 A | 3/2000 | Taskett et al. |
| 5,812,671 A | 9/1998 | Ross, Jr. | 6,047,053 A | 4/2000 | Miner et al. |
| 5,812,795 A | 9/1998 | Horovitz et al. | 6,047,327 A | 4/2000 | Tso et al. |
| 5,812,865 A | 9/1998 | Theimer et al. | 6,052,442 A | 4/2000 | Cooper et al. |
| 5,815,800 A | 9/1998 | Su et al. | 6,052,595 A | 4/2000 | Schellinger et al. |
| 5,818,824 A | 10/1998 | Lu et al. | 6,058,304 A | 5/2000 | Callaghan et al. |
| 5,826,191 A | 10/1998 | Krishnan | 6,060,997 A | 5/2000 | Taubenheim et al. |
| 5,828,882 A | 10/1998 | Hinckley | 6,061,570 A | 5/2000 | Janow |

| | | | |
|---|---|---|---|
| 6,064,342 A | 5/2000 | Sandhu et al. |
| 6,064,879 A | 5/2000 | Fujiwara et al. |
| 6,070,067 A | 5/2000 | Nguyen et al. |
| 6,081,703 A | 6/2000 | Hallqvist |
| 6,087,956 A | 7/2000 | Helferich |
| 6,088,127 A | 7/2000 | Pieterse |
| 6,088,717 A | 7/2000 | Reed et al. |
| 6,091,957 A | 7/2000 | Larkins et al. |
| 6,094,574 A | 7/2000 | Vance et al. |
| 6,097,941 A | 8/2000 | Helferich |
| 6,101,531 A | 8/2000 | Eggleston et al. |
| 6,115,248 A | 9/2000 | Canova et al. |
| 6,119,167 A | 9/2000 | Boyle et al. |
| 6,122,484 A | 9/2000 | Fuller et al. |
| 6,125,281 A | 9/2000 | Wells et al. |
| 6,128,490 A | 10/2000 | Shaheen et al. |
| 6,134,325 A | 10/2000 | Vanstone et al. |
| 6,134,432 A | 10/2000 | Holmes et al. |
| 6,138,158 A | 10/2000 | Boyle et al. |
| 6,144,313 A | 11/2000 | Nakano |
| 6,144,671 A | 11/2000 | Perinpanathan et al. |
| 6,145,079 A | 11/2000 | Mitty |
| 6,147,314 A | 11/2000 | Han et al. |
| 6,151,443 A | 11/2000 | Gable et al. |
| 6,151,491 A | 11/2000 | Farris et al. |
| 6,151,507 A | 11/2000 | Laiho |
| 6,169,883 B1 | 1/2001 | Vimpari et al. |
| 6,169,911 B1 | 1/2001 | Wagner et al. |
| 6,175,859 B1 | 1/2001 | Mohler |
| 6,178,331 B1 | 1/2001 | Holmes et al. |
| 6,185,423 B1 | 2/2001 | Brown et al. |
| 6,195,564 B1 | 2/2001 | Rydbeck et al. |
| 6,205,330 B1 | 3/2001 | Winbladh |
| 6,208,839 B1 | 3/2001 | Davani |
| 6,212,550 B1 | 4/2001 | Segur |
| 6,215,858 B1 | 4/2001 | Bartholomew et al. |
| 6,216,165 B1 | 4/2001 | Woltz et al. |
| 6,219,694 B1 | 4/2001 | Lazaridis et al. |
| 6,222,857 B1 | 4/2001 | Kammer et al. |
| 6,226,495 B1 | 5/2001 | Neustein |
| 6,230,133 B1 | 5/2001 | Bennett, III et al. |
| 6,230,188 B1 | 5/2001 | Marcus |
| 6,233,318 B1 | 5/2001 | Picard et al. |
| 6,233,430 B1 | 5/2001 | Helferich |
| 6,236,804 B1 | 5/2001 | Tozaki et al. |
| 6,246,871 B1 | 6/2001 | Ala-Laurila |
| 6,252,588 B1 | 6/2001 | Dawson |
| 6,253,061 B1 | 6/2001 | Helferich |
| 6,259,892 B1 | 7/2001 | Helferich |
| 6,272,532 B1 | 8/2001 | Feinleib |
| 6,278,862 B1 | 8/2001 | Henderson |
| 6,282,435 B1 | 8/2001 | Wagner et al. |
| 6,285,745 B1 | 9/2001 | Bartholomew et al. |
| 6,285,777 B2 | 9/2001 | Kanevsky et al. |
| 6,288,715 B1 | 9/2001 | Bain et al. |
| 6,292,668 B1 | 9/2001 | Alanara et al. |
| 6,298,231 B1 | 10/2001 | Heinz |
| 6,301,471 B1 | 10/2001 | Dahm et al. |
| 6,301,513 B1 | 10/2001 | Divon et al. |
| 6,317,085 B1 | 11/2001 | Sandhu et al. |
| 6,317,594 B1 | 11/2001 | Gossman et al. |
| 6,320,957 B1 | 11/2001 | Draganoff |
| 6,321,094 B1 | 11/2001 | Hayashi et al. |
| 6,321,267 B1 | 11/2001 | Donaldson |
| 6,330,244 B1 | 12/2001 | Swartz et al. |
| 6,330,308 B1 | 12/2001 | Cheston et al. |
| 6,333,919 B2 | 12/2001 | Gaffney |
| 6,333,973 B1 * | 12/2001 | Smith et al. ................ 379/88.12 |
| 6,343,219 B1 | 1/2002 | Wada |
| 6,344,848 B1 | 2/2002 | Rowe et al. |
| 6,351,523 B1 | 2/2002 | Detlef |
| 6,356,939 B1 | 3/2002 | Dahl |
| 6,361,523 B1 | 3/2002 | Bierman |
| 6,363,082 B1 | 3/2002 | Kammer et al. |
| RE37,618 E | 4/2002 | Helferich |
| 6,370,389 B1 | 4/2002 | Isomursu et al. |
| 6,373,835 B1 | 4/2002 | Ng |
| 6,381,650 B1 | 4/2002 | Peacock |
| 6,388,877 B1 | 5/2002 | Canova et al. |
| 6,389,457 B2 | 5/2002 | Lazaridis et al. |
| 6,389,572 B1 | 5/2002 | Garrabrant et al. |
| 6,397,059 B1 | 5/2002 | Vance et al. |
| 6,401,113 B2 | 6/2002 | Lazaridis et al. |
| 6,411,827 B1 | 6/2002 | Minata |
| 6,418,305 B1 | 7/2002 | Neustein |
| 6,418,307 B1 | 7/2002 | Amin |
| 6,421,678 B2 | 7/2002 | Smiga et al. |
| 6,422,147 B1 | 7/2002 | Shann |
| 6,424,841 B1 | 7/2002 | Gustafsson |
| 6,425,087 B1 | 7/2002 | Osborn et al. |
| 6,438,585 B2 | 8/2002 | Mousseau et al. |
| 6,441,824 B2 | 8/2002 | Hertzfeld |
| 6,442,243 B1 | 8/2002 | Valco et al. |
| 6,442,637 B1 | 8/2002 | Hawkins et al. |
| 6,449,344 B1 | 9/2002 | Goldfinger |
| 6,457,134 B1 | 9/2002 | Lemke et al. |
| 6,459,360 B1 | 10/2002 | Helferich |
| 6,462,646 B2 | 10/2002 | Helferich |
| 6,463,463 B1 | 10/2002 | Godfrey et al. |
| 6,463,464 B1 | 10/2002 | Lazaridis et al. |
| 6,484,027 B1 | 11/2002 | Mauney et al. |
| 6,501,834 B1 | 12/2002 | Milewski et al. |
| 6,505,237 B2 | 1/2003 | Beyda et al. |
| 6,510,453 B1 | 1/2003 | Apfel et al. |
| 6,516,202 B1 | 2/2003 | Hawkins et al. |
| 6,522,879 B2 | 2/2003 | Myer et al. |
| 6,523,124 B1 | 2/2003 | Lunsford et al. |
| 6,526,127 B1 | 2/2003 | Piotrowski et al. |
| 6,539,476 B1 | 3/2003 | Marianetti et al. |
| 6,546,083 B1 | 4/2003 | Chaves et al. |
| 6,564,249 B2 | 5/2003 | Shiigi |
| 6,567,179 B1 | 5/2003 | Sato et al. |
| 6,580,784 B2 | 6/2003 | Rodriguez et al. |
| 6,580,787 B1 | 6/2003 | Akhteruzzaman et al. |
| 6,587,681 B1 | 7/2003 | Sawai |
| 6,587,693 B1 | 7/2003 | Lumme et al. |
| 6,590,588 B2 | 7/2003 | Lincke et al. |
| 6,597,688 B2 | 7/2003 | Narasimhan et al. |
| 6,597,903 B1 | 7/2003 | Dahm et al. |
| 6,611,254 B1 | 8/2003 | Griffin et al. |
| 6,622,147 B1 | 9/2003 | Smiga et al. |
| 6,625,142 B1 | 9/2003 | Joffe et al. |
| 6,625,642 B1 | 9/2003 | Naylor et al. |
| 6,636,522 B1 | 10/2003 | Perinpanathan et al. |
| 6,636,733 B1 | 10/2003 | Helferich |
| 6,658,409 B1 | 12/2003 | Nomura et al. |
| 6,662,195 B1 | 12/2003 | Langseth et al. |
| 6,665,547 B1 | 12/2003 | Ehara |
| 6,665,803 B2 | 12/2003 | Osborn et al. |
| 6,671,715 B1 | 12/2003 | Langseth et al. |
| 6,687,839 B1 | 2/2004 | Tate et al. |
| 6,694,316 B1 | 2/2004 | Langseth et al. |
| 6,696,921 B2 | 2/2004 | Helferich |
| 6,701,378 B1 | 3/2004 | Gilhuly et al. |
| 6,728,530 B1 | 4/2004 | Heinonen et al. |
| 6,741,980 B1 | 5/2004 | Langseth et al. |
| 6,744,528 B2 | 6/2004 | Picoult et al. |
| 6,744,874 B2 | 6/2004 | Wu |
| 6,751,453 B2 | 6/2004 | Schemers et al. |
| 6,760,423 B1 | 7/2004 | Todd |
| 6,766,490 B1 | 7/2004 | Garrabrant et al. |
| 6,771,949 B1 | 8/2004 | Corliss |
| 6,775,264 B1 | 8/2004 | Kurganov |
| 6,775,689 B1 | 8/2004 | Raghunandan |
| 6,779,019 B1 | 8/2004 | Mousseau et al. |
| 6,779,022 B1 | 8/2004 | Horstmann et al. |
| 6,788,767 B2 | 9/2004 | Lambke |
| 6,792,112 B1 | 9/2004 | Campbell et al. |
| 6,792,544 B2 | 9/2004 | Hashem et al. |
| 6,807,277 B1 | 10/2004 | Doonan et al. |
| 6,813,489 B1 | 11/2004 | Wu et al. |
| 6,816,723 B1 * | 11/2004 | Borland ................... 455/412.1 |
| 6,823,225 B1 | 11/2004 | Sass |
| 6,826,407 B1 | 11/2004 | Helferich |
| 6,832,130 B2 | 12/2004 | Pintsov et al. |
| 6,868,498 B1 | 3/2005 | Katsikas |
| 6,869,016 B2 | 3/2005 | Waxelbaum |
| 6,871,214 B2 | 3/2005 | Parsons et al. |

| Patent/Publication | Date | Name |
|---|---|---|
| 6,880,079 B2 | 4/2005 | Kefford et al. |
| 6,882,709 B1 | 4/2005 | Sherlock et al. |
| 6,886,096 B2 | 4/2005 | Appenseller et al. |
| 6,892,074 B2 | 5/2005 | Tarkiainen et al. |
| 6,912,285 B2 | 6/2005 | Jevans |
| 6,912,400 B1 | 6/2005 | Olsson et al. |
| RE38,787 E | 8/2005 | Sainton et al. |
| 6,938,065 B2 | 8/2005 | Jain |
| 6,941,349 B2 | 9/2005 | Godfrey et al. |
| 6,944,283 B1 | 9/2005 | Klein |
| 6,950,679 B2 | 9/2005 | Sugiyama et al. |
| 6,952,599 B2 | 10/2005 | Noda et al. |
| 6,980,792 B2 | 12/2005 | Iivonen et al. |
| 6,983,138 B1 | 1/2006 | Helferich |
| 6,990,587 B2 | 1/2006 | Willins et al. |
| 7,003,304 B1 | 2/2006 | Helferich |
| 7,003,308 B1 | 2/2006 | Fuoss et al. |
| 7,006,459 B2 | 2/2006 | Kokot et al. |
| 7,007,239 B1 | 2/2006 | Hawkins et al. |
| 7,013,391 B2 | 3/2006 | Herle et al. |
| 7,017,181 B2 | 3/2006 | Spies et al. |
| 7,020,688 B2 | 3/2006 | Sykes, Jr. |
| 7,023,967 B1 | 4/2006 | Andersson et al. |
| 7,031,437 B1 | 4/2006 | Parsons et al. |
| 7,039,428 B1 | 5/2006 | Helferich |
| 7,054,905 B1 | 5/2006 | Hanna et al. |
| 7,058,390 B2 | 6/2006 | Chikazawa |
| 7,062,536 B2 | 6/2006 | Fellenstein et al. |
| 7,065,189 B2 | 6/2006 | Wakabayashi |
| 7,068,993 B2 | 6/2006 | Rai et al. |
| 7,072,642 B2 | 7/2006 | Yabe et al. |
| 7,076,528 B2 | 7/2006 | Premutico |
| 7,079,006 B1 | 7/2006 | Abe |
| 7,082,469 B2 | 7/2006 | Gold et al. |
| 7,082,536 B2 | 7/2006 | Filipi-Martin et al. |
| 7,088,990 B1 | 8/2006 | Isomursu et al. |
| 7,092,743 B2 | 8/2006 | Vegh |
| 7,100,048 B1 | 8/2006 | Czajkowski et al. |
| 7,107,246 B2 | 9/2006 | Wang |
| 7,113,601 B2 | 9/2006 | Ananda |
| 7,113,803 B2 | 9/2006 | Dehlin |
| 7,113,979 B1 | 9/2006 | Smith et al. |
| 7,116,762 B2 | 10/2006 | Bennett, III et al. |
| 7,116,997 B2 | 10/2006 | Byers et al. |
| 7,133,687 B1 | 11/2006 | El-Fishawy et al. |
| 7,146,009 B2 | 12/2006 | Andivahis et al. |
| 7,146,157 B2 | 12/2006 | Helferich |
| 7,149,537 B1 | 12/2006 | Kupsh et al. |
| 7,149,893 B1 | 12/2006 | Leonard et al. |
| 7,155,241 B2 | 12/2006 | Helferich |
| 7,188,186 B1 | 3/2007 | Meyer et al. |
| 7,218,919 B2 | 5/2007 | Vaananen |
| 7,233,655 B2 | 6/2007 | Gailey et al. |
| 7,239,338 B2 | 7/2007 | Krisbergh et al. |
| 7,251,314 B2 | 7/2007 | Huang |
| 7,254,384 B2 | 8/2007 | Gailey et al. |
| 7,277,692 B1 | 10/2007 | Jones et al. |
| 7,277,716 B2 | 10/2007 | Helferich |
| 7,280,838 B2 | 10/2007 | Helferich |
| 7,286,817 B2 | 10/2007 | Provost et al. |
| 7,289,797 B2 | 10/2007 | Kato |
| 7,299,036 B2 | 11/2007 | Sanding et al. |
| 7,299,046 B1 | 11/2007 | Ozugur et al. |
| 7,317,929 B1 | 1/2008 | El-Fishawy et al. |
| 7,333,817 B2 | 2/2008 | Tsuchiyama |
| 7,353,018 B2 | 4/2008 | Mauney et al. |
| 7,403,793 B2 | 7/2008 | Mauney et al. |
| 7,433,461 B1 | 10/2008 | Bauer |
| 2001/0005857 A1 | 6/2001 | Lazaridis et al. |
| 2001/0005860 A1 | 6/2001 | Lazaridis et al. |
| 2001/0005861 A1 | 6/2001 | Mousseau et al. |
| 2001/0013071 A1 | 8/2001 | Lazaridis et al. |
| 2001/0048737 A1 | 12/2001 | Goldberg et al. |
| 2001/0054115 A1 | 12/2001 | Ferguson et al. |
| 2002/0012323 A1 | 1/2002 | Petite |
| 2002/0023131 A1 | 2/2002 | Wu et al. |
| 2002/0029258 A1 | 3/2002 | Mousseau et al. |
| 2002/0032658 A1 | 3/2002 | Oki et al. |
| 2002/0035687 A1 | 3/2002 | Skantze |
| 2002/0038298 A1 | 3/2002 | Kusakabe et al. |
| 2002/0039419 A1 | 4/2002 | Akimoto et al. |
| 2002/0049818 A1 | 4/2002 | Gilhuly et al. |
| 2002/0052218 A1 | 5/2002 | Rhee |
| 2002/0065887 A1 | 5/2002 | Paik et al. |
| 2002/0065895 A1 | 5/2002 | Zhang et al. |
| 2002/0087645 A1 | 7/2002 | Ertugrul et al. |
| 2002/0091777 A1 | 7/2002 | Schwartz |
| 2002/0091782 A1 | 7/2002 | Benninghoff |
| 2002/0101998 A1 | 8/2002 | Wong et al. |
| 2002/0107928 A1 | 8/2002 | Chalon |
| 2002/0120696 A1 | 8/2002 | Mousseau et al. |
| 2002/0120788 A1 | 8/2002 | Wang et al. |
| 2002/0128036 A1 | 9/2002 | Yach et al. |
| 2002/0138735 A1 | 9/2002 | Felt et al. |
| 2002/0138759 A1 | 9/2002 | Dutta |
| 2002/0156691 A1 | 10/2002 | Hughes et al. |
| 2002/0178353 A1 | 11/2002 | Graham |
| 2002/0181701 A1 | 12/2002 | Lee |
| 2002/0194281 A1 | 12/2002 | McConnell et al. |
| 2002/0194285 A1 | 12/2002 | Mousseau et al. |
| 2003/0005066 A1 | 1/2003 | Lazaridis et al. |
| 2003/0009698 A1 | 1/2003 | Lindeman et al. |
| 2003/0037261 A1 | 2/2003 | Meffert et al. |
| 2003/0048905 A1 | 3/2003 | Gehring et al. |
| 2003/0050987 A1 | 3/2003 | Lazaridis et al. |
| 2003/0055902 A1 | 3/2003 | Amir et al. |
| 2003/0061511 A1 | 3/2003 | Fischer |
| 2003/0078058 A1 | 4/2003 | Vatanen et al. |
| 2003/0081621 A1 | 5/2003 | Godfrey et al. |
| 2003/0088633 A1 | 5/2003 | Chiu et al. |
| 2003/0097361 A1 | 5/2003 | Huang et al. |
| 2003/0115448 A1 | 6/2003 | Bouchard |
| 2003/0120733 A1 | 6/2003 | Forman |
| 2003/0126216 A1 | 7/2003 | Avila et al. |
| 2003/0126220 A1 | 7/2003 | Wanless |
| 2003/0142364 A1 | 7/2003 | Goldstone |
| 2003/0182575 A1 | 9/2003 | Korfanta |
| 2003/0187938 A1 | 10/2003 | Mousseau et al. |
| 2003/0191808 A1 | 10/2003 | Adler et al. |
| 2003/0194990 A1 | 10/2003 | Helferich |
| 2003/0204568 A1 | 10/2003 | Bhargava et al. |
| 2003/0220979 A1 | 11/2003 | Hejl |
| 2003/0222765 A1 | 12/2003 | Curbow et al. |
| 2003/0235307 A1 | 12/2003 | Miyamoto |
| 2003/0235308 A1 | 12/2003 | Boynton et al. |
| 2003/0237082 A1 | 12/2003 | Thurlow |
| 2004/0019780 A1 | 1/2004 | Waugh et al. |
| 2004/0021889 A1 | 2/2004 | McAfee et al. |
| 2004/0024824 A1 | 2/2004 | Ferguson et al. |
| 2004/0030906 A1 | 2/2004 | Marmigere et al. |
| 2004/0052340 A1 | 3/2004 | Joffe et al. |
| 2004/0059598 A1 | 3/2004 | Wellons et al. |
| 2004/0059914 A1 | 3/2004 | Karaoguz |
| 2004/0060056 A1 | 3/2004 | Wellons et al. |
| 2004/0073619 A1 | 4/2004 | Gilhuly et al. |
| 2004/0078488 A1 | 4/2004 | Patrick |
| 2004/0083271 A1 | 4/2004 | Tosey |
| 2004/0083365 A1 | 4/2004 | Renier et al. |
| 2004/0111478 A1 | 6/2004 | Gross et al. |
| 2004/0111480 A1 | 6/2004 | Yue |
| 2004/0116073 A1 | 6/2004 | Mauney et al. |
| 2004/0116119 A1 | 6/2004 | Lewis et al. |
| 2004/0122847 A1 | 6/2004 | Rodgers |
| 2004/0122905 A1 | 6/2004 | Smith et al. |
| 2004/0137884 A1 | 7/2004 | Engstrom et al. |
| 2004/0137955 A1 | 7/2004 | Engstrom et al. |
| 2004/0165727 A1 | 8/2004 | Moreh et al. |
| 2004/0185877 A1 | 9/2004 | Asthana et al. |
| 2004/0194116 A1 | 9/2004 | McKee et al. |
| 2004/0196978 A1 | 10/2004 | Godfrey et al. |
| 2004/0198348 A1 | 10/2004 | Gresham et al. |
| 2004/0199669 A1 | 10/2004 | Riggs et al. |
| 2004/0202327 A1 | 10/2004 | Little et al. |
| 2004/0203642 A1 | 10/2004 | Zatloukal et al. |
| 2004/0205106 A1 | 10/2004 | Adler et al. |
| 2004/0205248 A1 | 10/2004 | Little et al. |
| 2004/0205330 A1 | 10/2004 | Godfrey et al. |
| 2004/0208296 A1 | 10/2004 | Aboujaoude et al. |

| | | | | | | |
|---|---|---|---|---|---|---|
| 2004/0212639 A1 | 10/2004 | Smoot et al. | | 2006/0074706 A1 | 4/2006 | Gilham |
| 2004/0221014 A1 | 11/2004 | Tomkow | | 2006/0075027 A1 | 4/2006 | Zager et al. |
| 2004/0221048 A1 | 11/2004 | Ogier | | 2006/0080384 A1 | 4/2006 | Robinson et al. |
| 2004/0230657 A1 | 11/2004 | Tomkow | | 2006/0090065 A1 | 4/2006 | Bush et al. |
| 2004/0243677 A1 | 12/2004 | Curbow et al. | | 2006/0095510 A1 | 5/2006 | Rouse et al. |
| 2004/0243844 A1 | 12/2004 | Adkins | | 2006/0101119 A1 | 5/2006 | Qureshi et al. |
| 2004/0243847 A1 | 12/2004 | Way | | 2006/0133585 A1 | 6/2006 | Daigle et al. |
| 2004/0249768 A1 | 12/2004 | Kontio et al. | | 2006/0135128 A1 | 6/2006 | Skoog |
| 2004/0249895 A1 | 12/2004 | Way | | 2006/0155698 A1 | 7/2006 | Vayssiere |
| 2004/0249899 A1 | 12/2004 | Shiigi | | 2006/0155812 A1 | 7/2006 | Looman |
| 2004/0252727 A1 | 12/2004 | Mousseau et al. | | 2006/0168065 A1 | 7/2006 | Martin |
| 2004/0264121 A1 | 12/2004 | Orriss | | 2006/0168072 A1 | 7/2006 | Park |
| 2004/0266441 A1 | 12/2004 | Sinha et al. | | 2006/0177015 A1 | 8/2006 | Skakkebaek et al. |
| 2005/0003809 A1 | 1/2005 | Kato | | 2006/0182124 A1 | 8/2006 | Cole et al. |
| 2005/0009502 A1 | 1/2005 | Little et al. | | 2006/0187897 A1 | 8/2006 | Dabbs et al. |
| 2005/0015455 A1 | 1/2005 | Liu | | 2006/0190533 A1 | 8/2006 | Shannon et al. |
| 2005/0019634 A1 | 1/2005 | Legg | | 2006/0194572 A1 | 8/2006 | Fresonke et al. |
| 2005/0025172 A1 | 2/2005 | Frankel | | 2006/0200528 A1 | 9/2006 | Pathiyal |
| 2005/0025291 A1 | 2/2005 | Peled et al. | | 2006/0217112 A1 | 9/2006 | Mo |
| 2005/0025297 A1 | 2/2005 | Finnigan | | 2006/0218224 A1 | 9/2006 | Agrawal et al. |
| 2005/0038863 A1 | 2/2005 | Onyon et al. | | 2006/0218244 A1 | 9/2006 | Rassmussen et al. |
| 2005/0044160 A1 | 2/2005 | McElligott | | 2006/0221916 A1 | 10/2006 | Taylor et al. |
| 2005/0055413 A1 | 3/2005 | Keohane et al. | | 2006/0224893 A1 | 10/2006 | Sales et al. |
| 2005/0058124 A1 | 3/2005 | Helferich | | 2006/0230266 A1 | 10/2006 | Maes |
| 2005/0058260 A1 | 3/2005 | Lasensky et al. | | 2006/0233370 A1 | 10/2006 | Jung et al. |
| 2005/0060720 A1 | 3/2005 | Mayer | | 2006/0234680 A1 | 10/2006 | Doulton |
| 2005/0076109 A1 | 4/2005 | Mathew et al. | | 2006/0239424 A1 | 10/2006 | Walter |
| 2005/0091329 A1 | 4/2005 | Friskel | | 2006/0240868 A1 | 10/2006 | Kaplan et al. |
| 2005/0099654 A1 | 5/2005 | Chen | | 2006/0247962 A1 | 11/2006 | Harvey et al. |
| 2005/0099998 A1 | 5/2005 | Semper | | 2006/0248148 A1 | 11/2006 | Timmins et al. |
| 2005/0102381 A1 | 5/2005 | Jiang et al. | | 2006/0259558 A1 | 11/2006 | Yen |
| 2005/0108336 A1 | 5/2005 | Naick et al. | | 2006/0265660 A1 | 11/2006 | Hullot et al. |
| 2005/0108359 A1 | 5/2005 | Hyder et al. | | 2006/0270461 A1 | 11/2006 | Won et al. |
| 2005/0114652 A1 | 5/2005 | Swedor et al. | | 2006/0285533 A1 | 12/2006 | Divine et al. |
| 2005/0130631 A1 | 6/2005 | Maguire et al. | | 2006/0286990 A1 | 12/2006 | Juan et al. |
| 2005/0132010 A1 | 6/2005 | Muller | | 2007/0042747 A1 | 2/2007 | Sun |
| 2005/0135681 A1 | 6/2005 | Schirmer | | 2007/0117541 A1 | 5/2007 | Helferich |
| 2005/0137009 A1 | 6/2005 | Vetelainen | | 2007/0162454 A1 | 7/2007 | D'Albora et al. |
| 2005/0138353 A1 | 6/2005 | Spies | | 2007/0265838 A1 | 11/2007 | Chopra et al. |
| 2005/0141718 A1 | 6/2005 | Yu et al. | | 2008/0037582 A1 | 2/2008 | Wang |
| 2005/0148356 A1 | 7/2005 | Ferguson et al. | | 2008/0039052 A1 | 2/2008 | Knowles |
| 2005/0159107 A1 | 7/2005 | Mauney et al. | | 2009/0191848 A1 | 7/2009 | Helferich |
| 2005/0163320 A1 | 7/2005 | Brown et al. | | | | |
| 2005/0165740 A1 | 7/2005 | Kerr et al. | | FOREIGN PATENT DOCUMENTS | | |
| 2005/0176451 A1 | 8/2005 | Helferich | | EP | 631419 | 12/1994 |
| 2005/0180576 A1 | 8/2005 | Jevans | | EP | 0 695 071 | 1/1996 |
| 2005/0188024 A1 | 8/2005 | Singer | | EP | 777394 | 6/1997 |
| 2005/0188045 A1 | 8/2005 | Katsikas | | EP | 831664 | 9/1997 |
| 2005/0198143 A1 | 9/2005 | Moody et al. | | EP | 0 505 489 | 11/1997 |
| 2005/0198170 A1 | 9/2005 | LeMay et al. | | EP | 0 624 993 | 12/2003 |
| 2005/0198506 A1 | 9/2005 | Qi et al. | | JP | 56000096 | 1/1981 |
| 2005/0210064 A1 | 9/2005 | Caldini et al. | | JP | 63-283058 | 11/1988 |
| 2005/0210106 A1 | 9/2005 | Cunningham | | JP | 2-014571 | 1/1990 |
| 2005/0210246 A1 | 9/2005 | Faure | | JP | 3-500955 | 2/1991 |
| 2005/0210394 A1 | 9/2005 | Crandall et al. | | JP | 03232325 | 10/1991 |
| 2005/0216587 A1 | 9/2005 | John | | JP | 6-70292 | 3/1994 |
| 2005/0216735 A1 | 9/2005 | Huang | | JP | 6-261121 | 9/1994 |
| 2005/0229258 A1 | 10/2005 | Pigin | | JP | 6-276226 | 9/1994 |
| 2005/0251558 A1 | 11/2005 | Zaki | | JP | 06245254 | 9/1994 |
| 2005/0257057 A1 | 11/2005 | Ivanov et al. | | JP | 6-318899 | 11/1994 |
| 2005/0265551 A1 | 12/2005 | Hara | | JP | 06-326656 | 11/1994 |
| 2005/0282525 A1 | 12/2005 | Adams et al. | | JP | 7-503826 | 4/1995 |
| 2006/0013368 A1 | 1/2006 | LaBaw | | JP | 7-245773 | 9/1995 |
| 2006/0019638 A1 | 1/2006 | Chui et al. | | JP | 8-019025 | 1/1996 |
| 2006/0019639 A1 | 1/2006 | Adams et al. | | JP | 8-97854 | 4/1996 |
| 2006/0020667 A1 | 1/2006 | Wang et al. | | JP | 8-163637 | 6/1996 |
| 2006/0021038 A1 | 1/2006 | Brown et al. | | JP | 8-228368 | 9/1996 |
| 2006/0021066 A1 | 1/2006 | Clayton et al. | | JP | 8-265245 | 10/1996 |
| 2006/0026246 A1 | 2/2006 | Fukuhara et al. | | JP | 08336182 | 12/1996 |
| 2006/0029191 A1 | 2/2006 | Miller et al. | | JP | 9-146824 | 6/1997 |
| 2006/0041505 A1 | 2/2006 | Enyart | | JP | 9-200250 | 7/1997 |
| 2006/0041624 A1 | 2/2006 | Chen et al. | | JP | 2001-517891 | 10/2001 |
| 2006/0046720 A1 | 3/2006 | Toropainen et al. | | JP | 2000-513362 | 9/2005 |
| 2006/0046757 A1 | 3/2006 | Hoover et al. | | KR | 00164369 | 9/1998 |
| 2006/0047766 A1 | 3/2006 | Spadea | | WO | 89/05009 | 6/1989 |
| 2006/0053202 A1 | 3/2006 | Foo et al. | | WO | 92/14330 | 8/1992 |
| 2006/0068768 A1 | 3/2006 | Sanding et al. | | WO | 97/08906 | 3/1997 |
| 2006/0069737 A1 | 3/2006 | Gilhuly et al. | | WO | 9731488 | 8/1997 |
| 2006/0072761 A1 | 4/2006 | Johnson et al. | | | | |

| | | |
|---|---|---|
| WO | 97/32439 | 9/1997 |
| WO | 9858476 | 12/1998 |
| WO | 9965256 | 12/1999 |

OTHER PUBLICATIONS

Anonymous, "Newton Solutions Guide," Apple Computer, Inc. (1995).
Anonymous, "Newton Messaging Card Arrives," MacWeek (Sep. 1993).
Anonymous, "Allpen's Nethopper Lets Apple Newton Owners Surf Internet, Intranets," Tribune Business News (Jun. 1996).
Anonymous, § 3.2.9 ETSI GSM 3.40, "Digital Cellular Telecommunications System (Phase 2+) Technical Realisation of the Short Message Service Point-to-Point," v4.13.0, (May 1996).
Anonymous, "Eudora Pro for Newton Users' Guide," Eudora.
"New Wyndmail version 1.5 features another first for wireless industry," Business Wire (Author Unknown) (Aug. 19, 1996).
"WyndMail wireless e-mail now provides "Message Header Preview" for Apple Powerbook and MessagePad," Business Wire (Author Unknown) (Jan. 9, 1997).
U.S. Appl. No. 11/049,869, filed Feb. 4, 2005, DIV of U.S. Appl. No. 09/688,321, Non-Final Action Mailed (Nov. 27, 2006).
U.S. Appl. No. 11/635,781, filed Dec. 8, 2006, CON of U.S. Appl. No. 11/050,775, Pending.
U.S. Appl. No. 11/081,611, filed Mar. 17, 2005, CON of U.S. Appl. No. 09/688,321, Notice of Allowance Mailed (Apr. 10, 2007).
U.S. Appl. No. 11/082,872, filed Mar. 17, 2005, CON of U.S. Appl. No. 09/688,321, Issue Fee Paid (May 10, 2007).
U.S. Appl. No. 11/082,913, filed Mar. 18, 2005, DIV of U.S. Appl. No. 09/688,321, Non-Final Rejection (May 14, 2007).
U.S. Appl. No. 11/083,897, filed Mar. 18, 2005, CON of U.S. Appl. No. 09/688,321, Notice of Allowance Mailed (Apr. 5, 2007).
U.S. Appl. No. 11/399,513, filed Apr. 7, 2006, CON of U.S. Appl. No. 09/688,282, Pending.
U.S. Appl. No. 11/598,832, filed Nov. 14, 2006, CON of U.S. Appl. No. 11/108,759, Pending.
U.S. Appl. No. 60/126,939, filed Mar. 29, 1999, Expired.
U.S. Appl. No. 60/155,055, filed Sep. 21, 1999, Expired.
U.S. Appl. No. 10/958,731, filed Oct. 6, 2004, CON of U.S. Appl. No. 09/408,841, Docketed New Case—Ready for Examination.
U.S. Appl. No. 11/105,441, filed Apr. 14, 2005, CON of U.S. Appl. No. 10/958,731, Docketed New Case—Ready for Examination.
U.S. Appl. No. 10/445,257, filed May 27, 2003, CON of U.S. Appl. No. 09/540,490, Abandoned.
U.S. Appl. No. 11/598,202, filed Nov. 13, 2006, CON of U.S. Appl. No. 10/445,257, Pending.
Anonymous, "Envoy Wireless Communicator User's Guide," Motorola, Inc. (1994).
Anonymous, "General Magic OS Targets US, Japan," Reed Business Information (1996).
Anonymous, "MessagePad 2000: New Newton Exceeds Expectation," TidBITS #379 (May 12, 1997).
Anonymous, "NETCOM and RadioMail form Strategic Alliance Enabling NETCOM Customers to Exchange Email, Send Faxes and Access Web Sites Wireless," Business Wire (Dec. 11, 2006).
Anonymous, "New Features of the Newton 2.0 Operating System," Apple Computer, Inc. (1995).
Anonymous, "New RadioMail Package Brings Maximum Affordability and Simplicity to Wireless Communications," AllBusiness (Feb. 27, 1996).
Anonymous, "Newton Apple MessagePad Handbook," Apple Computer, Inc. (1995).
Anonymous, "Newton Internet Enabler," (1997).
Anonymous, "Newton MessagePad (Original) Specs," EveryMac.com (1996).
Anonymous, "RadioMail Corporation Releases Wireless Internet Access Solution for CDPD Carriers," Business Wire (Oct. 7, 1996).
Anonymous, "Using E-Mail on Your Newton Device," Apple Computer, Inc. (1997).
Anonymous, "Sony Electronics Introduces Magic Link PIC-2000," Business Wire (Oct. 30, 1995).

Denise Shelton, "RadioMail can Find, Retrieve Web Pages," CNET News (Jun. 4, 1996).
Ira Brodsky, "Instant Gratification," Telephone Online (Jan. 15, 1999).
Mark Kellner, "Earthquake and RadioMail," The Washington Times (Jan. 24, 1994).
Mike Fine, "The AllPoints Wireless PC Card and RadioMail Service," www.palmtoppaer.com (Date Unknown).
Stuart Price, "Product Reviews: Eudora Pro for Newton 1.0," MacUser (Dec. 22, 1996).
"Notice of Grounds of Rejection," Japanese Patent App. No. 2008-302127, dated Jun. 30, 2009.
"Notice of Grounds of Rejection," Japanese Patent App. No. 2009-052859, dated Oct. 6, 2009.
"Notice of Grounds of Rejection," Japanese Patent App. No. 2009-052858, dated Oct. 6, 2009.
Anonymous, "Second Generation Personal Handy Phone System," pp. 117-119, dated Jun. 25, 1996.
"Final Rejection," Japanese Patent App. No. 2008-302127, dated Apr. 13, 2010.
"Final Rejection," Japanese Patent App. No. 2009-052858, dated Apr. 22, 2010.
"Notice of Grounds of Rejection," Japanese Patent App. No. 2010-001327, dated Aug. 17, 2010 (including English Translation).
Fuhrt, Design issues for interactive television systems, Computer Magazine, May 1995.
Henriksen, Mobile Data Network System Description, Norwegian Telecommunications Administration Research Dept, Apr. 1986.
Crispin, Interactive Mail Access Protocol—Version 2, Request for Comments 1176, Network Working Group, Aug. 1990.
Kaspersen, vol. 1 Network architecture addressing and routing, Mobile Data.
Network Description, Teledirektoratets forskningsavdeling, Mar. 1989.
Kaspersen, vol. 2 Service and service elements, "Mobile Data Network Description", Teledirektoratets forskningsavdeling, Apr. 1989.
Kaspersen, vol. 6 Requirements to the Base Station, "Mobile Data Network Description", Teledirektoratets forskningsavdeling, Jul. 1989.
Kaspersen, vol. 7 Requirements to the Mobile Stations, "Mobile Data Network Description", Teledirektoratets forskningsavdeling, Sep. 1989.
Kramer, Use of two-way wireless messaging for personal telephone management, University of Wisconsin Record, Jun. 1905.
Anonymous, re Nokia 9000i Communicator, Owner's Manual Issue 1.1, Undated.
Anonymous, Changes from Pine 3.96 to 4.00, Computing and Networking, University of Washington, Feb. 2001.
Anonymous, Active Paper's Presto!Mail to be bundled with Envoy 150 Wireless Communicator from Motorola, Business Wire, Apr. 1996.
Crispin, Internet Message Access Protocol Version 4, Request for Comments 2060, Network Working Group, Dec. 1996.
Rodriquez, Motorola provides NetWare access to paging networks, InfoWorld, May 1995.
Joseph, Rover: a toolkit for mobile information access, SIGOPS Dec. 1995, Jan. 1900.
Hardy, SkyTel is set to launch two-way-paging—Mtel unit is poised for big gains in wireless business, Wall Street Journal, Sep. 1995.
Anonymous, Motorola unveils next-generation Tango products at PCS '96; Tanto Lite guarantees message delivery and receipt, Business Wire, Sep. 1996.
Kaspersen, vol. 3 Protocols and protocol hierarchy within the MDN, "Mobile Data Network Description", Teledirektoratets forskningsavdeling, May 1989.
Kaspersen, vol. 4 Specification of DTL and DTP within the MDN, "Mobile Data Network Description", Teledirektoratets forskningsavdeling, Jun. 1989.
Kaspersen, vol. 8 Specification of the MDN-MHS inter-working, "Mobile Data Network Description", Teledirektoratets forskningsavdeling, Aug. 1989.
Anonymous, UP Browser Manual, Unwired Planet, Aug. 1996.
Anonymous, UP HDML Language Reference, Jul. 1996.

Anonymous, UP Up.Link Developer's Guide, Jul. 1996.
Verjinkski, PHASE, a portable host access system environment, Unisys Defense Systems, Jan. 1900.
Kylanpaa, Nomadic access to information services by a GSM phone, Computer & Graphics, Jun. 1905.
Anonymous, Cost of Ownership Analysis Instructions, Unwired Planet, Jun. 2010.
Anonymous, The Mobile Intranet—wireless internet access with UP Link by Unwired Planet, Jun. 1905.
Butler, Post Office Protocol Version 2, Request for Comments 937, Network Working Group, Feb. 1985.
Taylor, Internetwork Mobility—the CDPD Approach, Jun. 1996.
Anonymous, Narrowband Sockets Specification Intel and Nokia, Sep. 1996.
deLespinasse, Rover Mosaic: E-mail communication for a full-function web browser, Master's Thesis, MIT, Jun. 1995.
Freed, Borenstein, RFC 2045, MIME format standards, Nov. 1996.
Anonymous, Wikipedia, "Personal Communications Service" (Date Unknown).
Anonymous, Wikipedia, "SMS" (Date Unknown).
"Claim Charts Applying 5,905,777 (Foladare et al.) to Selected Claims of Helferich U.S. Patent Nos. 7,499,716, 7,280,838, and 7,155,241" (Apr. 15, 2010).
Anonymous, Compiled Redacted Correspondence regarding Tso '327 Reference, 2010.
Order Granting/Denying Request for Ex Parte Reexamination of US Pat 7,280,838, claims 1-96, Control No. 90/009,883, (Apr. 26, 2011).
Non-Final Rejection in Ex Parte Reexamination of U.S. Pat 7,835,757, Control No. 90/009,882, (Jun. 17, 2011).
Non-Final Rejection in Ex Parte Reexamination of U.S. Pat 7,499,716, Control No. 90/009,880, (Jun. 17, 2011).
Patentee Response and Request for Reconsideration of Non-Final Rejection in Ex Parte Reexamination of U.S. Pat 7,835,757, Control No. 90/009,882 (Jun. 29, 2011).
Patentee Response and Request for Reconsideration of Non-Final Rejection in Ex Parte Reexamination of U.S. Pat 7,499,716, Control No. 90/009,880 (Jun. 29, 2011).
Request for Ex Parte Reexamination of US Pat 7,835,757, claims 1-20, Control No. 90/009,882, Andrea G. Reister (Feb. 25, 2011).
Request for Ex Parte Reexamination of US Pat 7,499,716, claims 1-18 and 21-69, Control No. 90/009,880, Andrea G. Reister (Feb. 25, 2011).
Request for Ex Parte Reexamination of US Pat 7,280,838, claims 1-96, Control No. 90/009,883, Andrea G. Reister (Feb. 25, 2011).
"Information Disclosure Statement by Applicant" filed in Reexam of US Pat 7,835,757, Andrea G. Reister (Feb. 25, 2011).
"Information Disclosure Statement by Applicant" filed in Reexam of US Pat 7,499,716, Andrea G. Reister (Feb. 25, 2011).
"Information Disclosure Statement by Applicant" filed in Reexam of US Pat 7,280,838, Andrea G. Reister (Feb. 25, 2011).
Order Granting/Denying Request for Ex Parte Reexamination of US Pat 7,835,757, claims 1-20, Control No. 90/009,882, (Mar. 25, 2011).
Order Granting/Denying Request for Ex Parte Reexamination of US Pat 7,499,716, claims 1-18 and 21-69, Control No. 90/009,880, (Mar. 25, 2011).
Notice of Failure to Comply With Ex Parte Reexamination Request Requirements (37 CFR 1.510(c)), Control No. 90/009,883 (Mar. 29, 2011).
Decision Vacating Notice of Failure to Comply (Form PTOL-2077), Control No. 90/009,883 (Apr. 6, 2011).
Thesis of A.F. deLespinasse, "Rover Mosaic: E-mail Communication for a Full-Function Web Browser," Massachusetts Institute of Technology (archived Aug. 10, 1995, in MIT Library) (hereinafter "Rover Mosaic").
A.D. Joseph et al., "Rover: A Toolkit for Mobile Information Access," Proceedings of the Fifteenth ACM Symposium on Operating Systems and Principles, Copper Mountain Resort, Colorado, pp. 156-171 (Dec. 3-6, 1995) (hereinafter Rover Toolkit).
M.M. Tso, et al. "Always On, Always Connected Mobile Computing," 1996 5th IEEE International Conference on Universal Personal Communications Record, vol. 1 of 2, Sessions 1-6, Cambridge Marriott Hotel, Cambridge, Massachusetts, pp. 918-924 (Sep. 29-Oct. 2, 1996) (hereinafter "Always On, Always Connected").

Vaudreuil, Internet Engineering Task Force Request for Comments 1911: "Voice Profile for Internet Mail," pp. 1-22 (Feb. 1996) (hereinafter "RFC 1911"); and.
Yeong, et al., Internet Engineering Task Force Request for Comments 1487: "X.500 Lightweight Directory Access Protocol," pp. 1-21 (Jul. 1993) (hereinafter "RFC 1487").
Order Denying Request for Inter Partes Reexamination of U.S. Patent No. 7,280,838 (assigned Control No. 95/001,740) (Oct. 28, 2010).
Request for Ex Parte Reexamination of US Pat 7,835,757, claims 2-20, Control No. 95/001,739, Andrea G. Reister (Sep. 6, 2011).
Request for Ex Parte Reexamination of US Pat 7,499,716, claims 15, 17, 189, and 21-29, Control No. 95/001,738, Andrea G. Reister (Sep. 6, 2011).
Request for Ex Parte Reexamination of US Pat 7,280,838, claims 9-20, Control No. 95/001,740, Andrea G. Reister (Sep. 6, 2011).
"Information Disclosure Statement by Applicant" filed in 95/001,739 (Inter Partes Reexamination of 7,835,757) by Andrea G. Reister (Sep. 6, 2011).
"Information Disclosure Statement by Applicant" filed in 95/001,738 (Inter Partes Reexamination of 7,499,716) by Andrea G. Reister (Sep. 6, 2011).
"Information Disclosure Statement by Applicant" filed in 95/001,740 (Inter Partes Reexamination of 7,280,838) by Andrea G. Reister (Sep. 6, 2011).
Non-Final Office Action in 90/009,883 (Ex Parte Reexamination of 7,280,838) (Sep. 28, 2011).
Patentee Response After Final Office Action in 90/009,880 (Ex Parte Reexamination of 7,499,716) (Oct. 5, 2011).
Examiner Summary of Interview in 90/009,880 (Ex Parte Reexamination of 7,499,716) (Sep. 30, 2011).
Patentee Supplemental Response After Final Office Action in 90/009,880 (Ex Parte Reexamination of 7,499,716) (Oct. 13, 2011).
Notice of Intent to Issue Reexamination Certificate in 90/009,880 (Ex Parte Reexamination of 7,499,716) (Oct. 21, 2011).
Patentee Response After Final Office Action in 90/009,882 (Ex Parte Reexamination of 7,835,575) (Oct. 5, 2011).
Examiner Summary of Interview in 90/009,882 (Ex Parte Reexamination of 7,835,757) (Sep. 29, 2011).
Advisory Action in 90/009,882 (Ex Parte Reexamination of 7,835,757) (Oct. 21, 2011).
Patentee Supplemental Response After Final Office Action in 90/009,882 (Ex Parte Reexamination of 7,835,575) (Nov. 1, 2011).
3GPP TS 23.140 V6, "Multimedia Messaging Service (MMS); Functional Description, Stage 2 (Release 6)" (Mar. 2009).
Reilly, et al., "Enabling Mobile Network Manager," Computer Networks and ISDN Systems 29, 1417-1428 (1997).
T. Berners-Lee, "RFC 1945: Hypertext Transfer Protocol—HTTP/1.0," May 1996.
M. Crispin, "RFC 1730: Internet Message Access Protocol—Version 4," Dec. 1994.
N. Freed, "RFC: 2046: Multipurpose Internet Mail Extensions (MIME) Part Two: Media Types," Nov. 1996.
J. Meyers, "RFC 1939: Post Office Protocol—Version 3," May 1996.
J. Postel, "RFC 793: Transmission Control Protocol," Sep. 1981.
Nokia 9000 Communicator User's Manual, Issue 2 (1995).
Order Denying Request for Inter Partes Reexamination of U.S. Patent No. 7,499,716 (assigned Control No. 95/001,738) (Nov. 4, 2011).
Order Denying Request for Inter Partes Reexamination of U.S. Patent No. 7,835,757 (assigned Control No. 95/001,739) (Nov. 4, 2011).
"Active Channel Server Frequently Asked Questions (FAQ)", Microsoft Corporation, Q181161, 2006, 2 pages.
"Introduction to Active Channel Technology", Microsoft Corporation, 2006, 5 pages.
Anonymous, PatentAtlas, "Patent Cluster Tree Encompassing the Subject in Question: SAMPLE" (date unknown).
Anonymous, usamobility.com, "ReFLEX Wireless Data Technology" (date unknown).
Engst, A.C., "The Real TidBITS Channel", TidBITS Electronic Publishing, 1998, 4 pages.
Engst, A.C., "TidBITS#349/Oct. 14, 1996," TidBITS Electronic Publishing, 1996, 10 pages.
Form 1449, filed in Patent No. 5,438,611, Campana, Jr. et al., Issued Aug. 1, 1995, 1 page.

Gillay, C.Z., "Subscriptions, Channels, and Active Desktop", TechNotes, Franklin, Beedle & Associates, Inc., 1999, pp. 1-6.

International Preliminary Examination Report dated Jul. 10, 2001 (7 pages) PCT/US00/08261 Jul. 1, 2001.

Khare, R., et al., "Scenarios for an Internet-Scale Event Notification Service (ISENS)", Internet-Draft, Aug. 13, 1998, 18 pages.

PLUS Patent Linguistics Utility Search Results for U.S. Appl. No. 10/445,257, Searched Mar. 16, 2005.

Siewiorek, D.P., et al., "Computer Structures: Principles and Examples", McGraw-Hill Book Company, 1982, 21 pages.

Statutory Invention Regisration No. H610; Date: Mar. 7, 1989, Focarile et al.

Winnick Cluts, N., et al., "A Preview of Active Channel and the Active Desktop for Internet Explorer 4.0", Microsoft Corporation, 1997, 13 pages.

Compiled Plaintiff's Response to Defendant's Initial Invalidity Contentions and Defendant's Initial Invalidity Contentions exchanged in NDIL Case No. 1:10-cv-04387 (Dec. 2010).

Notice of Intent to Issue Reexamination Certificate ("NIRC") in Ex Parte Reexamination of 7,835,757 (Control No. 90/009,882), Examiner Ovidio Escalante (Dec. 9, 2011).

Examiner's Interview summary in Ex Parte Reexamination of 7,280,838 (Control No. 90/009,883), (Dec. 13, 2011).

Patentee's Response after Non-Final Office Action in Ex Parte Reexamination of 7,280,838 (Control No. 90/009,883), (Nov. 28, 2011).

Kaashoek, M. Frans, et al., "Dynamic Documents: Mobile Wireless Access to the WWW", IEEE Computer Society (Chs. 1-3) (1995).

Chau, Jonathan, "Internet Explorer 3.0," Microsoft (Nov. 1, 1996).

"How to Set Up Windows 95's 'Dial-Up Networking' for Auto-Dial with 32-bit Internet Applications," Stanford University Customer Assistance.

"Windows NT Internet and Intranet Development. Chapter 3: Microsoft Internet Mail".

Lemay, Laura, "Teach Yourself WEB Publishing with HTML in 14 days" (1996).

Wolfe, David, "Designing and Implementing Microsoft Proxy Server, Chapter 11" (1997).

"MSDN Library-file Protocol," Microsoft.

McFedries, Paul, "Windows 95 Unleashed," SAMS Publishing (Ch. 32) (1996).

"GSM Originating Call Flow," EventHelix (2008).

"GSM Terminating Call Flow," EventHelix (2004).

"GSM, SIP, H323, ISUP and IMS Call Flows," EventHelix.

"Eudora Mail Pro, Version 3.0 User Manual," QUALCOMM (pp. 30, 32, 50, and 53) (Jun. 1997).

\* cited by examiner

SYSTEMS AND METHODS FOR DOWNLOADING INFORMATION TO A MOBILE DEVICE

This application is a continuation of U.S. patent application Ser. No. 11/108,759, filed on Apr. 19, 2005 (status: Pending), which is a continuation of U.S. patent application Ser. No. 09/513,998, filed on Feb. 23, 2000 (Now U.S. Pat. No. 6,983,138), which is a continuation of U.S. patent application Ser. No. 08/989,874, filed on Dec. 12, 1997 (Now U.S. Pat. No. 6,097,941). The contents of the above referenced applications are incorporated herein by this reference.

The present invention relates generally to the field of communication systems, and more particularly to systems for allowing users to access and manage voice and other messages.

BACKGROUND OF THE INVENTION

Recent ubiquity of mobile communications systems and devices increases demand for remote access to and ability to manage voice messages and similar messages, records or files. Conventional remote voice message access generally occurs through mobile telephony devices or through pagers. Such conventional approaches typically require users to master a sophisticated list of commands, rules, procedures and protocols in order to access and manage voice mail even on one platform. For instance, simply to forward a message may require the user to know that the forward command is "73," which should not be confused with the reply all command "74." This command then presents the user with a voice menu which requires time to hear and requires multiple additional keystrokes and commands in order to forward the message. Issues become more tedious and acute in mobile telephony, where users on cellphones who may be driving or in cramped quarters find themselves simply unable to refer to a list of voice mail menu options, and may not have the time required to work through the menu in order to forward the message. Where users maintain an account or mail box on more than one system or provider, they must master multiple sets of such commands, rules, procedures and protocols and the inconvenience and problems intensify. Pagers often, do not impose the same level of interface complexity, but for that very reason they typically fail to provide the user an acceptable range of options for accessing and managing voice messages.

Conventional mobile approaches to voice mail access and management present other issues. In conventional mobile telephony systems, users may communicate via analog (for example, cellular) or digital (for example, PCS) link with the platform on which voice messages are stored in order to access messages. Such users typically employ standard dual tone multi frequency (DTMF) key interfaces for communicating with, controlling and managing messages on the voice messaging platforms. Such voice mail access and management sessions require excessive bandwidth, however, because the user must be "on line" (in communication via radio link, or otherwise connected or coupled) with the platform and thus occupying radio spectrum. Such sessions can create additional expense to the user and impose extra load upon the telecommunications infrastructure. Such sessions also impose unnecessary demands on the user unit's power system, upon which radio transmission activities impose a considerable load.

U.S. Reissue Pat. No. 34,976 and its antecedent U.S. Pat. No. 5,003,576 to Helferich et al. (Reissued Jun. 20, 1995 and originally issued Mar. 26, 1991) (which disclosures are incorporated herein by this reference) disclose systems in which voice messages and other messages typically created in analog form may be downloaded to cellular telephones and/or other user units for access and management at least partially to address some of these issues. Although such systems disclosed in those documents contemplate transmission of an analog signal, it would also be desirable to download messages via digital radio link such as those conventionally employed in PCS.

Another paradigm for considering optimal access and management of voice messages is in the context of paging systems. Paging receivers are typically more efficient than cellular or PCS devices in energy consumption and use of spectrum among other reasons because they are in an active mode or transmit mode for shorter periods of time. User available information, however, is limited to vibration, tone, tone and voice or data messages. Conventional paging systems which include voice retrieval typically use analog voice channels for transmission and reception of voice messages. Accordingly, voice paging systems have been proposed which include user devices that can, via radio link, download, digitize and store voice messages for access and management in the user unit. In this regard, see U.S. Pat. No. 5,455,579 to Bennett, et al. issued Oct. 3, 1995 (which disclosure is incorporated herein by this reference). Such systems allow users to access and download voice messages to pagers or pager like devices in batch mode, but do not allow the user to access and manage the voice messages on the platform where they are initially stored (or other remote platforms) in the event that the user wishes to do so.

SUMMARY OF THE INVENTION

According to the present invention, user devices include an interface which allows the user to access and manage voice messages and other information which is stored on the devices as well as on remote devices to which the user devices may be coupled via radio frequency link. Processes according to the present invention employ user input to such interfaces for access and management of messages stored on the user devices and, when such a device is on line with a remote platform at which the user's messages are stored, to provide automatic access and management to messages stored there as well. In the event that the user device is not in communication with the remote platform, processes according to the present invention automatically establish a communications session in order to provide such automatic access and message management.

It is accordingly an object of the present invention to provide a single user interface which allows user to access and manage voice messages and other information stored in the user's device as well as at, in or on remote devices, platforms or locations.

It is an additional object of the present invention to allow a user to access and manage messages stored on his or her own user device as well as on remote devices using a single interface and an analog or digital radio frequency link.

It is an additional object of the present invention to conserve radio spectrum by enabling efficient access and management of voice messages and other information in a number of locations, on a number of platforms, using a single interface.

It is an additional object of the present invention to allow users to access and manage voice messages and other information from any number of other sources stored in any number of locations without requiring the users to be conversant in different access and management interfaces, procedures, rules and protocols for each platform on which messages or information happen to be stored.

It is an additional object of the present invention to provide user devices which access and manage voice messages in their own memory capacity, but which also access and manage messages at remote sites via radio frequency link with power efficiencies and with spectrum efficiencies more akin to paging networks than the less efficient (from a power point of view and currently from a spectrum point of view) cellular and PCS voice message systems.

It is an additional object of the present invention to provide voice messaging interfaces which feature intuitive and direct commands, such as pushing a designated "forward" button in order to forward a message, and which thus eliminate the need for users to memorize or refer to a list of commands in order to access and manage voice messages.

Other objects, features, and advantages of the present invention will become apparent with respect to the remainder of this document.

BRIEF DESCRIPTION OF THE DRAWINGS

FIG. 5 is a flow diagram of a process according to a preferred embodiment of the present invention for playing and/or retrieving messages.

DETAILED DESCRIPTION OF THE DRAWINGS

Figure 1:
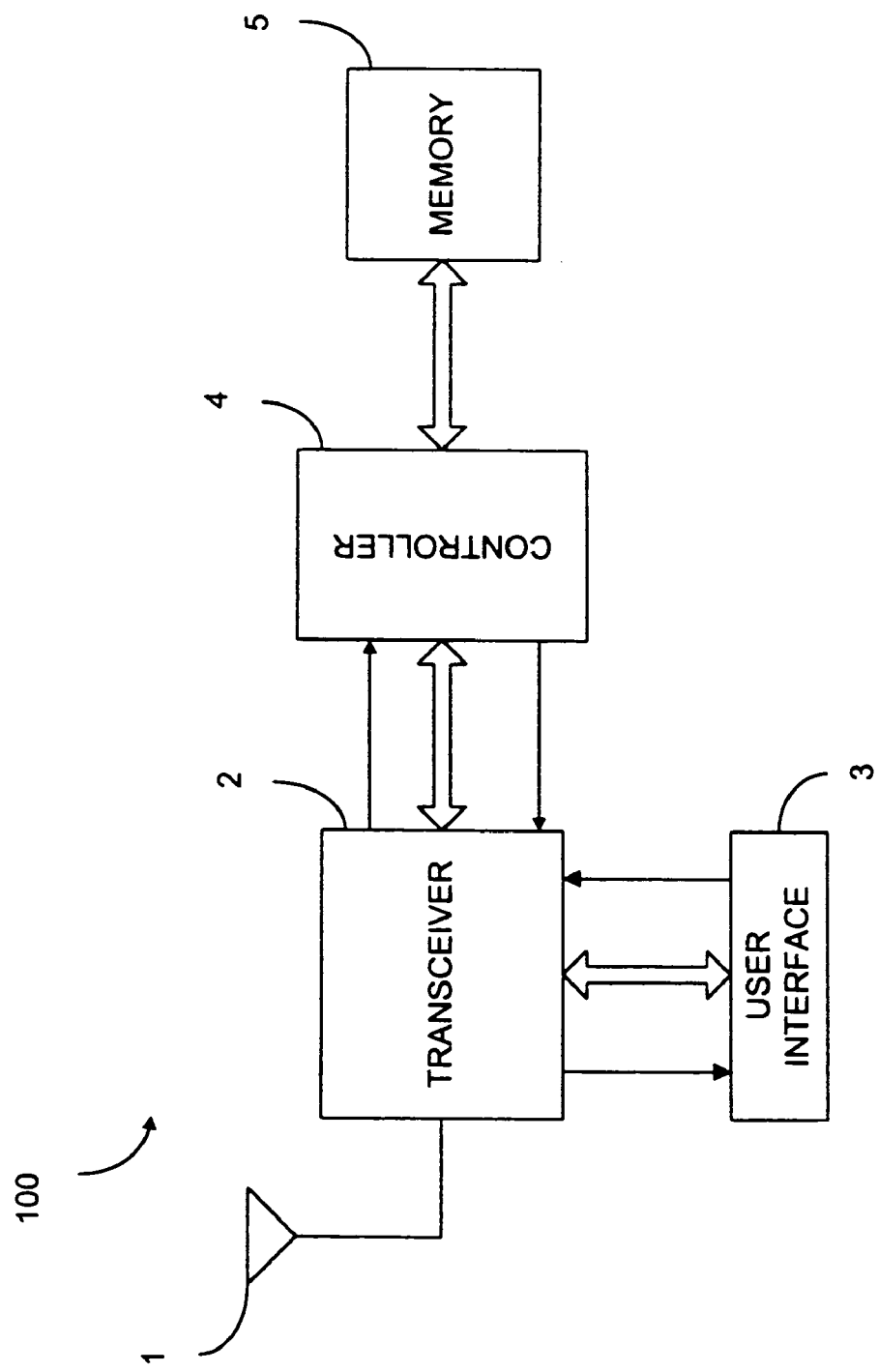
FIG. 1 is a simplified functional block diagram of a user device according to a preferred embodiment of the present invention.

FIG. 1 shows a basic functional block diagram of a paging transceiver 100 according to a preferred embodiment of the present invention. A transmit/receive antenna 1 is connected to transceiver 2 for transmitting and receiving signals such as selective call signals, command data signals and information data signals via conventional radio frequency link. Transceiver 2 may be of any conventional design such as those utilized in two way pagers, mobile radios or portable cellular telephones and similar devices, products or equipment. Transceiver 2 is coupled to a user interface 3 which contains appropriate input and output devices including, for example, a microphone speaker, alert transducer, LED or LCD display, keypad and necessary switches. The user interface 3 may also contain other types of input/output devices depending on the messaging application such as video display, camera, scanner, printer or voice recognition devices, and others. The user interface 3 of the present invention may be of any sort which allows the user to communicate with the transceiver 2. The transceiver 2 is coupled to and communicates with the digital signal processor (DSP) 4. DSP's are conventional in portable cellular transceivers for signal processing purposes. A message memory 5 is coupled to DSP 4 for storing messages. Message memory 5 may be static RAM, Dynamic RAM, Flash RAM, or any type of memory suitable or the messages to be stored and addressed in a manner that allows them to be accessed and managed.

Figure 2:
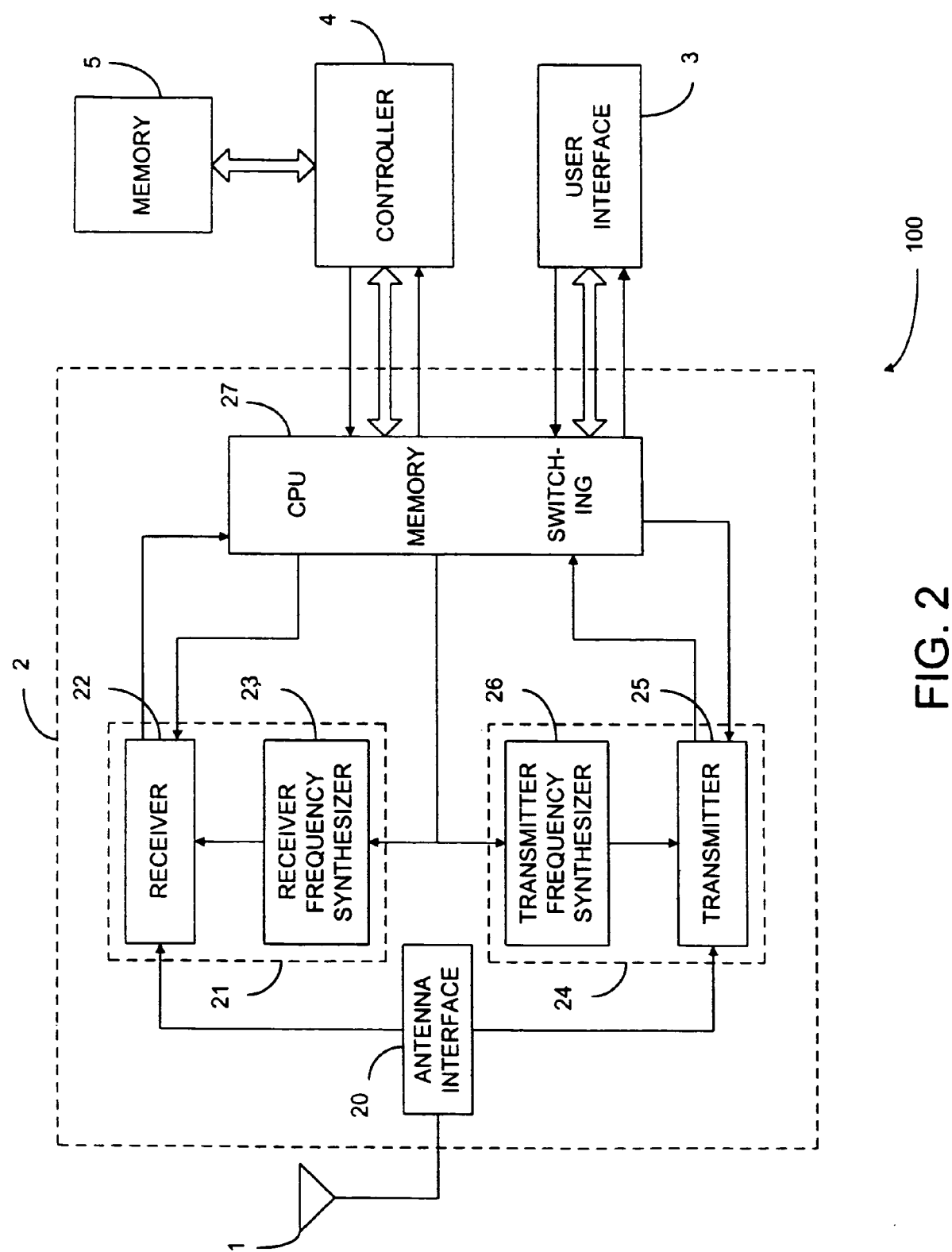
FIG. 2 is a more detailed functional block diagram of a user device according to a preferred embodiment of the present invention.

FIG. 2 shows transceiver 2 in greater detail. An antenna interface 20, for example a conventional cellular duplexer, antenna transmit/receive switch or other device or component or system may be utilized to provide signal isolation and otherwise couple the antenna to the transceiver. Optionally two antennas may be utilized in order to eliminate the antenna interface 20. Antenna interface 20 couples received signals to receiver 22 of receive section 21. Receive frequency synthesizer 23 couples to receiver 22 for selecting the receive frequency. Transmit section 24 comprises a transmitter 25 coupled to antenna interface 20 for transmitting signals using antenna 1. A transmit frequency synthesizer 26 is connected to transmitter 25 for selecting the transmit frequency. A processor chip set or CPU 27 comprises all necessary RAM and ROM memory, signal and data switching circuitry, signal processing circuitry, I-O Ports including all necessary program instructions and stored options commonly utilized in portable cellular telephones. Cellular telephone program instructions and necessary chip set circuitry are conventional and may be obtained from a variety of suppliers.

CPU 27, DSP 4 and other components of devices and systems according to the present invention, if desired, individually and/or collectively contain program instructions and algorithms necessary to process, store and reproduce and otherwise access and manage messages such as voice messages or other messages in connection with the present invention. These instructions and algorithms may, for instance, be stored within a particular DSP for application specific purposes, such as video processing and storage, speech processing and storage, modem signal processing and numerous other types of signal processing applications. Optionally, DSP 4 may be an alternative hardware device such as codec or digital to analog/analog to digital conversion circuit or other type of modulator-demodulator including memory interface circuitry coupled to message memory 5 for reading and writing and other accessing and management of messages.

Figure 3:
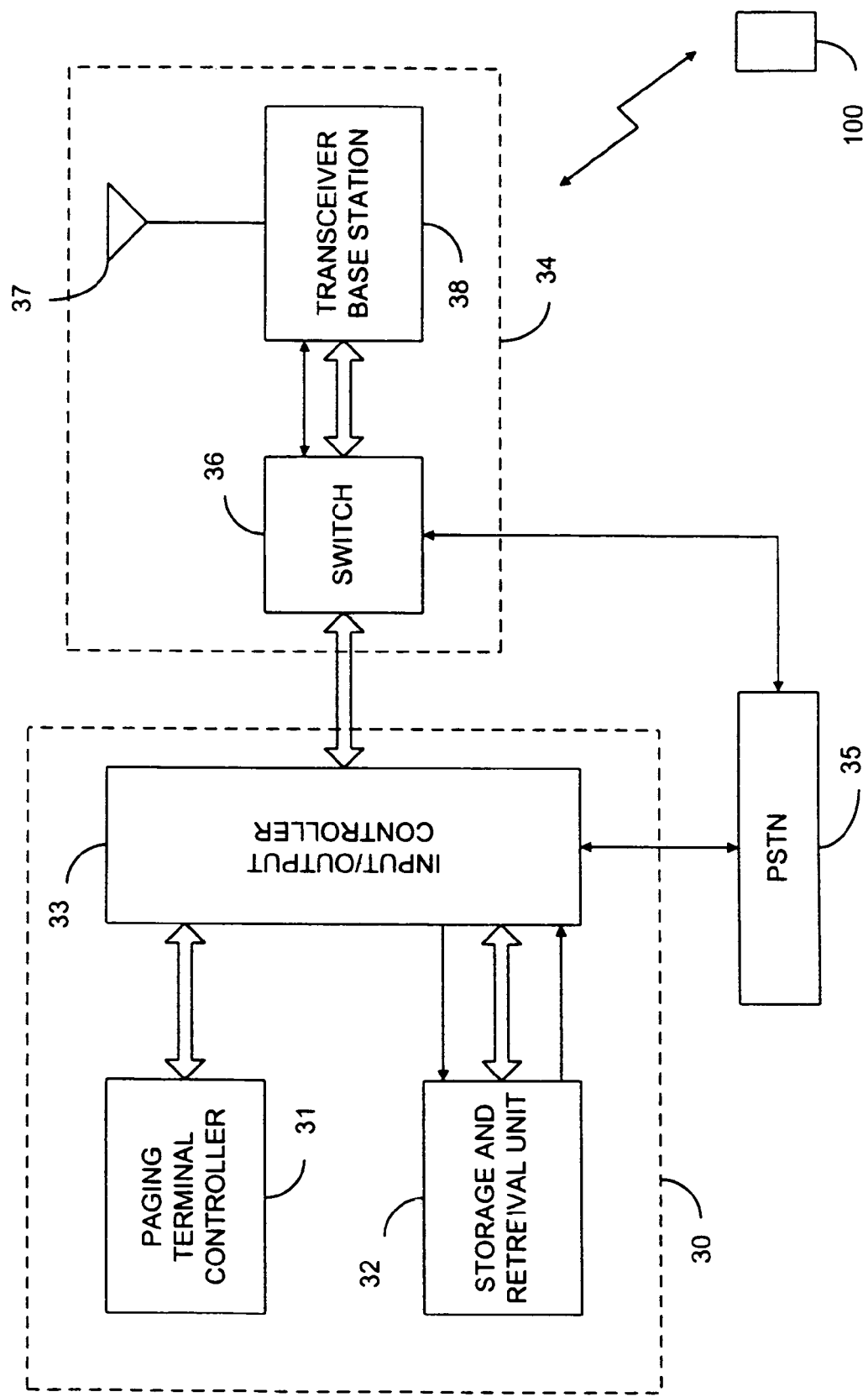
FIG. 3 is a functional block diagram of a remote device according to the preferred embodiment of the present invention which is adapted to store voice messages and other information for access and management by, among other things, user devices such as those shown functionally in FIGS. 1 and 2.

FIG. 3 shows a system 30 interconnected to a base station or remote unit 34. Conventional telephone company or other telecommunications or PSTN equipment 35 communicates with the base station 34 and system 30 in conventional fashion. The system 30 can comprise a paging terminal controller 31 which may comprise a controller circuit and associated memory (not shown) having a database of subscriber listings and corresponding selective call address fields. The paging terminal controller 31 communicates with storage and retrieval unit 32 and correlates messages with subscriber listings. The storage and retrieval unit 32 may comprise appropriate processor or control circuitry, message information and program memory, memory interface circuitry and DSP capacity with appropriate operational code for storage and retrieval of the desired messages. The input/output controller 33 contains all necessary input and output circuitry such as encoders and decoders, modems and required routing and control circuitry (not shown) for communicating with the paging terminal controller 31, the storage and retrieval unit 32, telephone company equipment 35 and base station 34. Such base stations and their components may be conventional.

Figure 4:
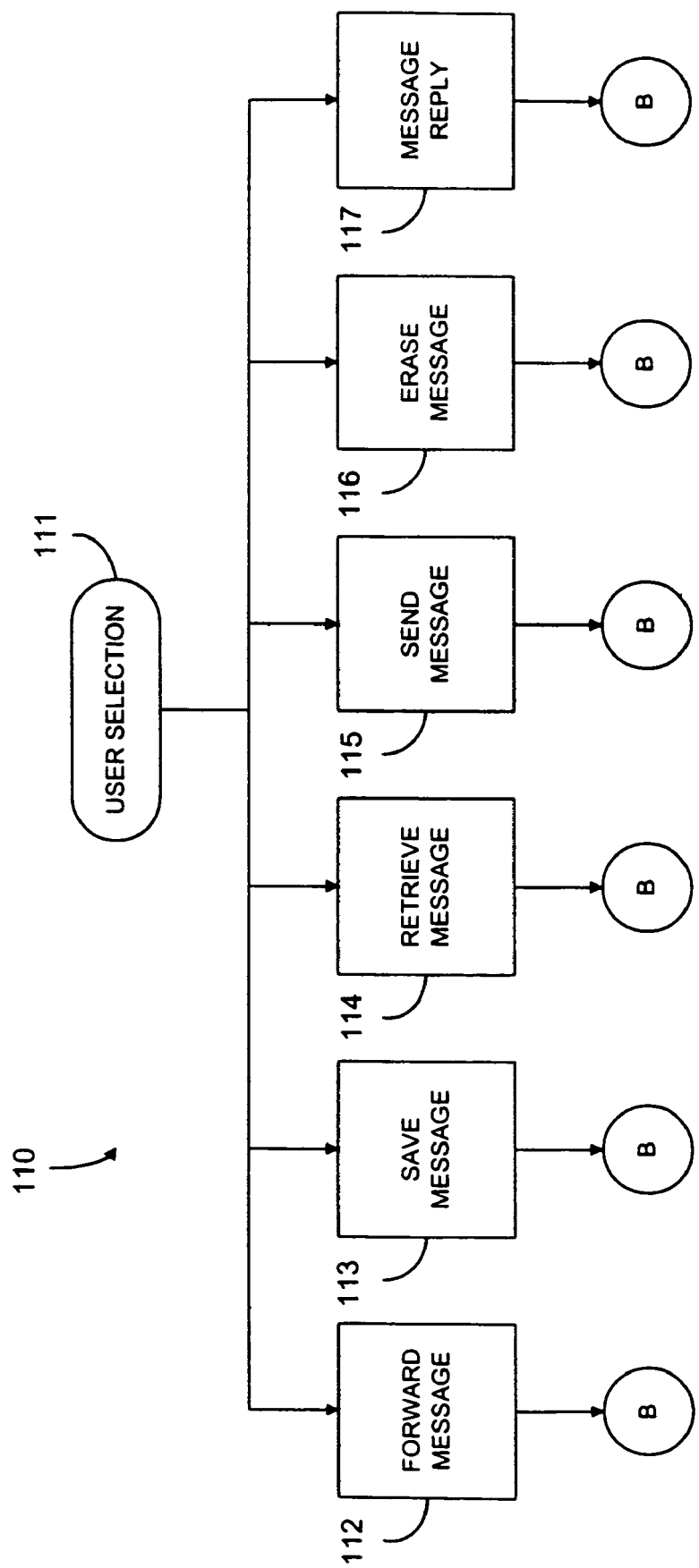
FIG. 4 is a schematic diagram for an interface according to a preferred embodiment of the present invention for accessing and managing messages on a plurality of platforms.

FIG. 4 is a schematic diagram for a preferred embodiment of an interface according to the present invention for user selectable function requests at the paging transceiver 100 in order to access and manage messages. At step 111, the user selects a function to be performed. Flow proceeds to the desired function selected. At step A, messages may be selected by the user to be forwarded to one or a plurality of addresses. Items such as messages and send message lists may be selected by scrolling through the message number or name. Selected messages may reside at the paging transceiver 100 or at the system 30. At step B, a selected message may be saved. At step C, selected messages are retrieved for reproduction and/or storage. At step D, messages may be sent to another or a plurality or recipients such as another paging transceiver 100. At step E, the selected message may be erased. At step F, a reply may be sent to the originator of a selected message.

Figure 5:
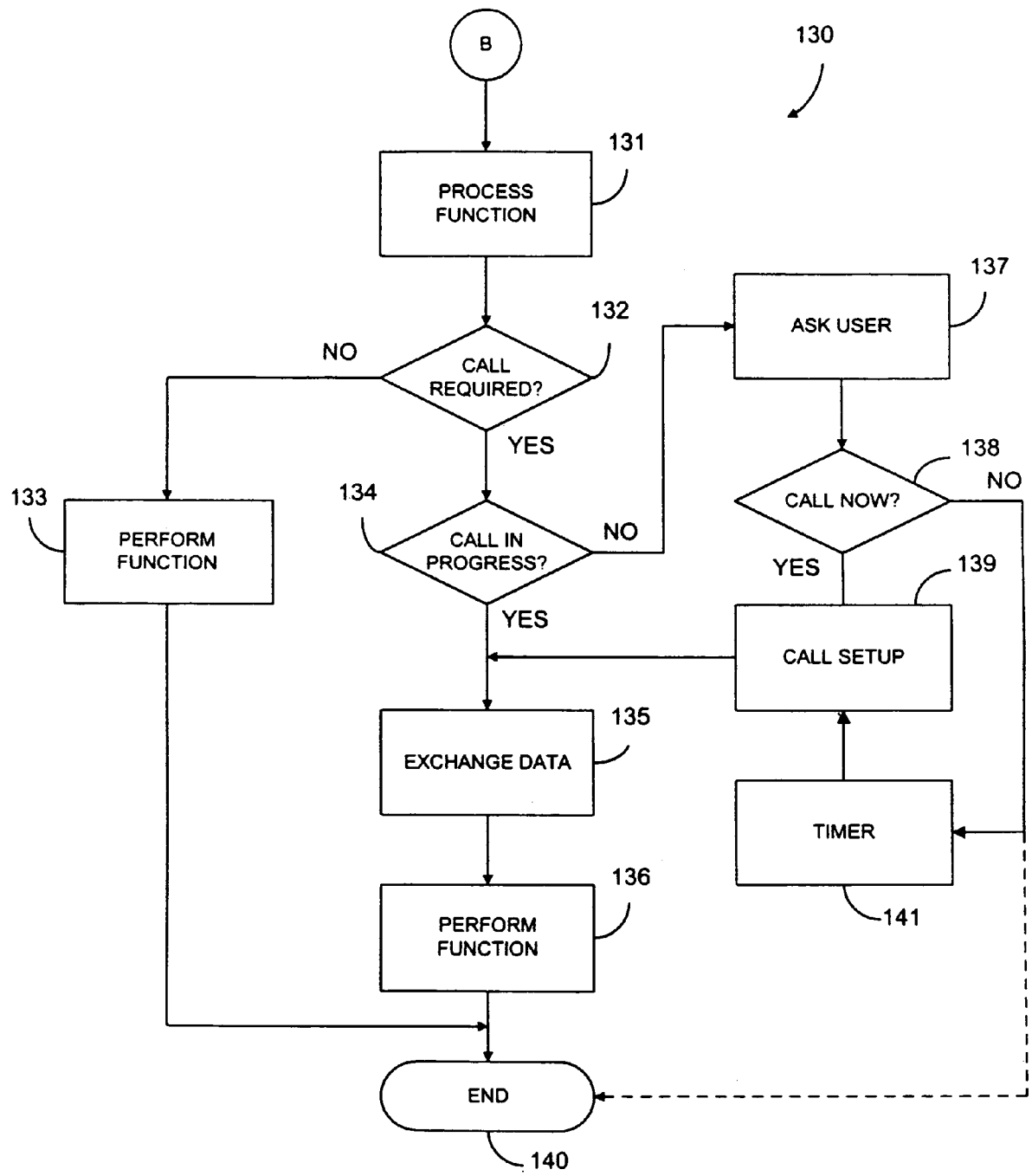
FIG. 5 is a flow diagram of a process according to a preferred embodiment of the present invention for initiating a communications session with a remote device and accessing and managing messages at the remote device and in the user's device.

FIG. 5 shows a flow diagram illustrating one version of process flow to implement functions A-F shown in FIG. 4. When forward message (step A) is selected, flow proceeds to step 131, where CPU 27 reads information pertaining to the message or plurality of messages selected by the user to be forwarded. The information may include a message identifier, location data, message length, message type, destination addresses, or other so-called CI type data. Flow proceeds to step 132 where it is determined whether the message can be forwarded without communicating with the system 30. If so, the appropriate function is performed at step 133 to handle the messages as desired by the user. If not, flow proceeds to step 134 where CPU 27 determines if a call is in progress. If a call is in progress flow proceeds to step 135 where CI data is exchanged with the system 30 for forwarding messages. If the messages to be forwarded are located at the system 30, the messages are simply flagged for forwarding to the appropriate addresses, step 136, and confirmation is communicated to the paging transceiver 100. If the message is not located at system 30, it is transmitted from paging transceiver 100 to system 30 at step 136. The process ends at step 140. If at step 134, it is determined that a call is not in progress, the user is asked if the message should be forwarded now, step 137. If the user selects yes, a call is established with system 30, step. 139, and flow continues as previously described. If no, CPU 27 retains the forwarding information in memory for forwarding the message during a subsequent call with system 30 and process ends, step 140.

The paging transceiver 100 and system 30 may exchange status information during messaging calls initiated by the paging transceiver 100 or by selective call (i.e. page calls) initiated by the system 30. The status information may contain information corresponding to messages stored within the paging transceiver 100 or within the system 30. For example, if the system 30 erases a message that has resided in its memory for too long a period of time (i.e. an unsaved, read message) the system 30 may inform the paging transceiver 100 that the message no longer exists. If the message identifier stored in the paging transceiver 100 no longer corresponds to a message stored in the system 30 or the paging transceiver 100, CPU 27 can remove the identifier for the no longer existing message.

In operation, the user selects a message or messages to be forwarded. The user also selects recipient. If the message resides at the system 30, it is simply forwarded to the addressed recipient. If the message is located in the paging transceiver 100 t is first transmitted to the system 30 before it can be forwarded to the intended recipient. In order to conserve time and resources, the system 30 will preferably not accept receipt of a message from the paging transceiver 100 if the same message already exists at the system 30. The system 30 will simply perform the required function with the already present duplicate message.

Returning now to FIG. 5, if a save message function B is selected flow proceeds to step 131, where the message identifier to be saved is read by CPU 27 and flow proceeds to step 132, where CPU 27 determines if the message identified selected corresponds to a message already stored in message memory 5 and if the selected function can be processed off line. If yes, flow proceeds to step 133, where a save message flag is set by CPU 27 in order to protect the message stored in message memory 54 from being over written and the process ends, step 140. If at step 132, it is determined that the message is not stored at the paging transceiver 100, flow proceeds to step 134, where a determination is made to see if a call is in progress. If a messaging call is in progress, CI data instructing the system 30 to save the message is sent. System 30 flags the stored message and sends a message saved acknowledgment or confirmation signal (Ack) to the paging transceiver 100, step 136. The CPU 27 converts the Ack to status information and informs the user that the message is saved at the system 30. The process ends at step 140. If at step 134, it is determined that the paging transceiver 100 is not currently in communication with the system 30, CPU 27 flags the message identifier for saving and the user is asked if the call should be made now, step 137. If no, step 138, the flag is kept for transmission to system 30 at a later time such as during a selective call to the paging transceiver 100 or during a messaging call to system 30. If yes, flow proceeds to step 139 where a call is set up for transmitting the save flag and CI data as previously described.

Returning now to function C of FIG. 5, if the retrieve message function is selected, flow proceeds to step 131 where message identifiers corresponding to messages to be returned are read from CPU 27 memory for retrieving the message. Additionally, CPU 27 may read message location information, system ID information, address information, message length information, message type information and the like as previously described. Flow proceeds to step 132, where CPU 27 determines where the message is located and if a call to system 30 is required. If the message is stored in message memory 5 of FIG. 1, flow proceeds to step 133, where the message is retrieved. The message may be an audio message, visual message or electronic signal for transferring to another device. At step 132, if the message does not reside in message memory 5, CPU 27 determines that a call is required to retrieve the message and flow proceeds to step 134, where it is determined if a call is in progress. If a call is in progress, flow proceeds to step 135 where CI data is exchanged such as which messages to retrieve, message length, message type, message identifier and the like. Flow proceeds to step 136 where the message is retrieved and simultaneously stored in message memory 5 by DSP 4 of FIG. 1. The appropriate status information corresponding to the message is stored in CPU 27 memory and the process ends. If at step 134 a call is not in progress, the user is asked if the call should be made now or if during another call, step 137. Flow proceeds to step 138 where if the user chooses to place the call now then flow proceeds to step 139 and the call is processed. If the user chooses to delay the call until another session, the message is left flagged for retrieval at the next session and the process ends, step 140. It should be noted that when the user chooses to postpone the call at step 138, a timer 141 may be inserted so that the message may be retrieved at a desired time or a retrieval instruction may be sent from system 30 to paging transceiver 100 for causing the paging transceiver 100 to automatically retrieve a message or plurality of messages at a time designated by system 30. For example, it may be desirable to have emergency weather information automatically retrieved during night time hours when telephone line charges and air time charges are less. The above described options may also be utilized for forwarding messages, erasing messages, saving messages, sending messages and replying to messages as will be shown in more detail hereinafter.

Referring now to the send message function D of FIG. 5: In order to send a message, the message must typically first be stored at the paging transceiver 100 or the system 30. The process of storing or recording messages is conventional. It is only necessary that the stored message be identified, addressed to a recipient and properly identified in accordance with the description of the present invention. Examples of these devices are described in U.S. Pat. No. 4,602,129 to Matthew, et al., (which is incorporated herein by this reference) and U.S. Reissue Pat. No. Re. 34,976 to Helferich, et al. (which, together with its underlying patent, has been incorporated by reference above). System 30 and paging transceiver of the present invention can be configured to record, store and retrieve a plurality of different types of messages as previously described depending on the application required. Returning to send message function D, when send message function D is selected, flow proceeds to step 131 where the selected message to be sent is identified and cross referenced to the selected recipient address information. Flow proceeds to step 132 and continues through the process in the same manner as forwarding a message, function A. The message to be sent may reside in the paging transceiver 100 or the system 30. If the message resides in the system 30 and the paging transceiver 100, the message in the system 30 corresponding to the CPU 27 message identifier will be sent in order to conserve time. If the message does not reside in system 30, the message will be sent from the paging transceiver 100 to the system 30. If the message is to be sent from the paging transceiver 100, it may be a pre stored message or alternatively, the message may be transmitted to system 30 by paging transceiver 100 in real time during a call session between system 30 and paging transceiver 100.

Referring now to erase message function E of FIG. 5, the erase message function allows a user to erase messages stored at the system 30 or at the paging transceiver 100 depending on the mode of operation. Given that a message may be erased without erasing the message identifier, if a message is erased at the paging transceiver and the identifier still exists, the message can be retrieved from the system 30. In order to remove a message identifier at the paging transceiver 100, the message must be erased at the system 30. At step 131, the selected message to be erased is identified and the user is asked if the selected message in the paging transceiver is to be erased or if both copies of the message are to be erased. If the local message only is selected to be erased, the message identification information is retained and flow proceeds to step 133 where the message stored in memory 5 of FIG. 1 is flagged for erasure or overwriting. In other words, the message still exists but may be over written by another message when memory space is required. The message may be retrieved from message memory until it is over written. If at step 132, a decision was made to erase both copies of the message, flow proceeds to step 134 where CPU 27 determines if a call is in progress. If yes, flow proceeds to step 135, where CI data is exchanged instructing system 30 to erase the message. Flow proceeds to step 131 where system 30 transmits an Ack that the message was erased, CPU 27 flags the local message for erasure, the identifier is removed and both copies of the message and the identifiers are erased. If at step 134, it is determined that a call is not in progress, flow proceeds to step 137, where the local message is erased and the user is asked if the system 30 copy of the message needs to be erased now. If yes, flow proceeds to step 139, the call is established and the process continues as previously described. If no, the necessary flags are set for erasing the remote message during the next communication with system 30. Again, timer option 141 may be utilized for a timed erase of the message stored at system 30.

Referring now to message reply function F of FIG. 5, the reply message function F is for sending a reply to an already received message. A reply message utilizes the same process as a send message except that a return address is already correlated to the message designated for reply. During send message function D the user is required to select an address or destination for the message to be sent. In other words, the user must know the destination or address in advance. Message reply function F does not require that the user know the address of the recipient because the message being replied to has a corresponding return address. Just like send message function D, a reply message may be sent in real time or it may be prerecorded and stored in the paging transceiver 100 for transmission to system 30. Additionally, the replay transmission may be delayed for a set period of time as previously described.

The common user interface of the present invention serves to control functions at the paging transceiver 100 and/or corresponding functions of system 30, (i.e. a remote device), depending on the location of a message and the communications status of the paging transceiver 100.

Figure 6:
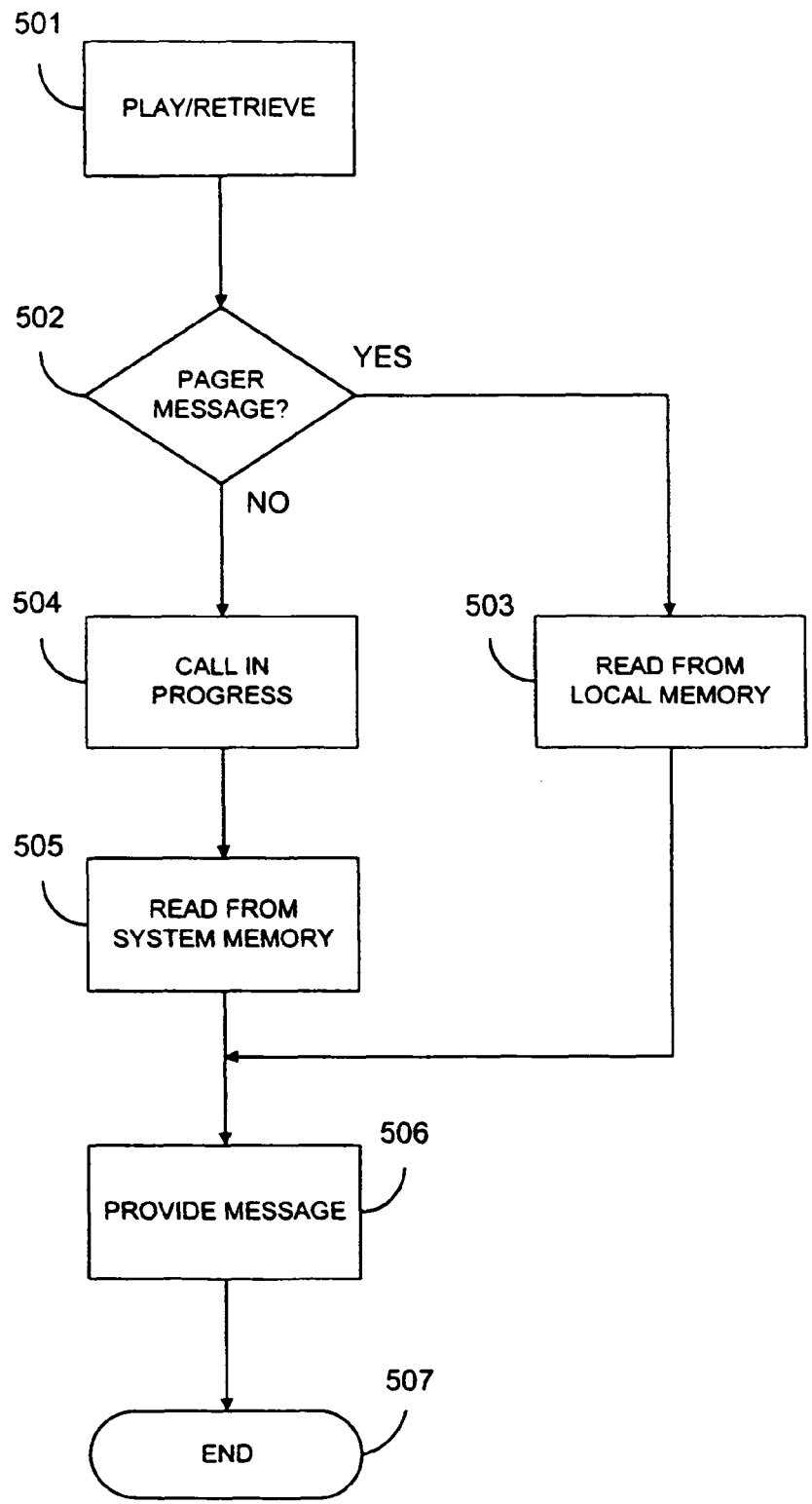

FIG. 6 shows process flow for when the user of devices such as paging transceiver 100 wishes to play a selected message (i.e. a message from John Doe). The operator simply presses keys or otherwise manipulates or actuates the interface in a manner to cause the interface to recognize a "play" input, step 501. This can occur via any man/machine interface components which feature appropriate properties, including appropriate look and feel, structure, cost, compatibility with electronic and structural environment and convenience. Such components can, for instance be conventional keypad, single dimension or multi dimension mouse coupled to an appropriate screen, buttons, voice actuated, or other components. Flow proceeds to step 502 where CPU 27 determines if the message identifier information selected corresponds to a message stored at the paging transceiver 100. If yes, flow proceeds to step 503 where the message is read from message memory 5 and the message is played. If at step 502 the result is no, flow proceeds to step 504 where if the paging transceiver 100 is on line flow proceeds to step 506. If it is not, the call process is activated to go on line as previously described and flow proceeds to step 506 where the message is read from store and retrieval unit 32 and played for the operator while the message is simultaneously stored in paging transceiver 100 message memory 5. The process ends at step 507.

Figure 7:
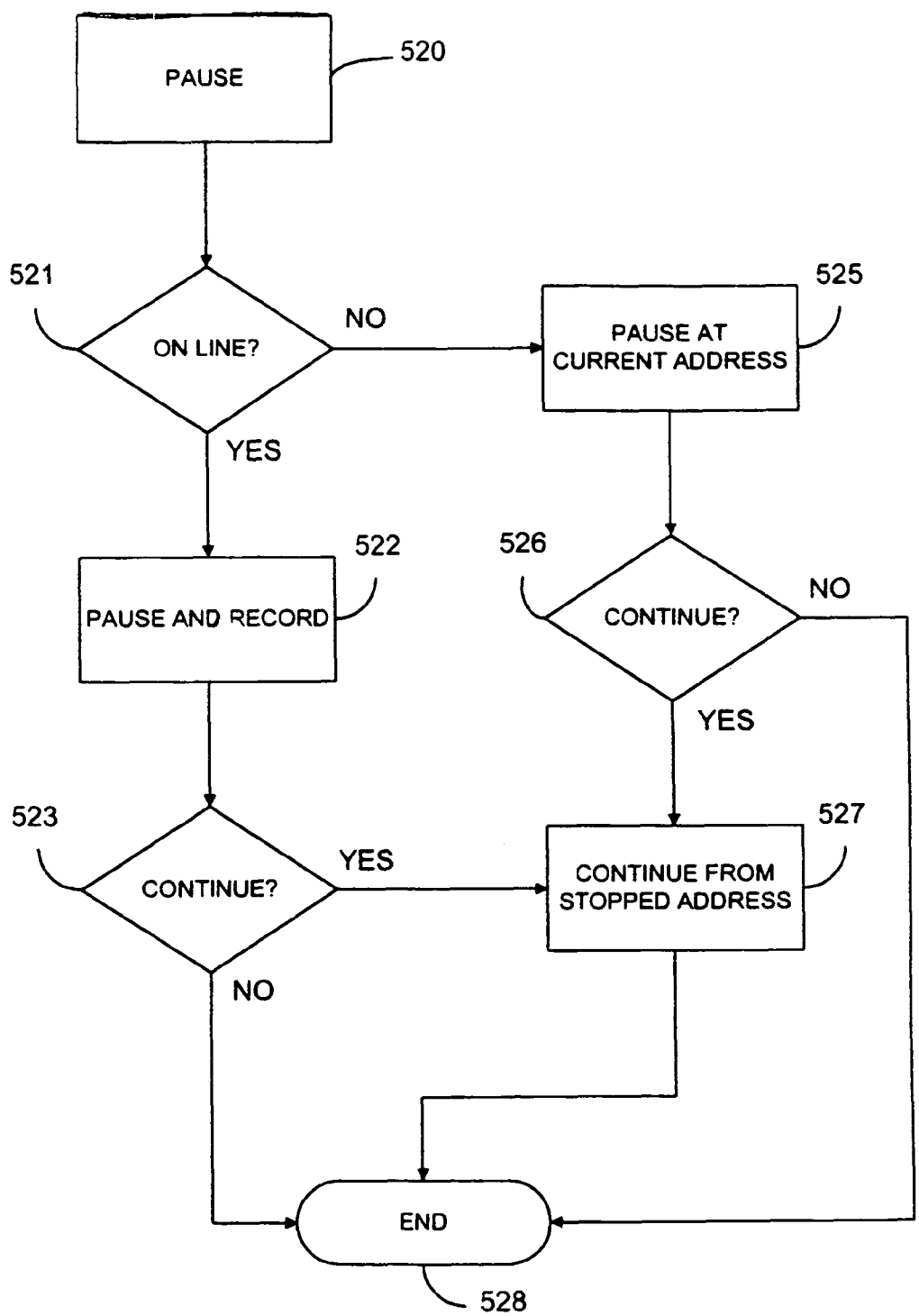
FIG. 7 is a flow diagram for a process according to a preferred embodiment of the present invention for pausing while playing messages.

FIG. 7 shows process flow for when a message is playing and the user wishes to use the interface to create a 'pause,' step 520. Flow proceeds to step 521 where a test is made to determine if the message is being played. If the message is playing from system 30, flow proceeds to step 522 where the message that the operator hears is paused while the message continues to be recorded in paging transceiver 100 message memory 5. Flow proceeds to step 523 where CPU 27 determines if the operator released the pause function. If not, the paging transceiver remains in pause mode (i.e. muted) and the process ends, step 524. If at step 523 the operator releases the pause button, flow proceeds to step 527 where the message begins to play from the location in memory from which pause was last pressed. The process ends at step 528. If at step 521, it is determined that the message is playing from message memory 5, flow proceeds to step 525 where playing of the message is suspended and flow proceeds to step 526 where a test is made to determine if the operator released the pause button. If no, the process ends, step 529. If yes, the message begins to play from the last paused address and the process ends at step 528.

Figure 8:
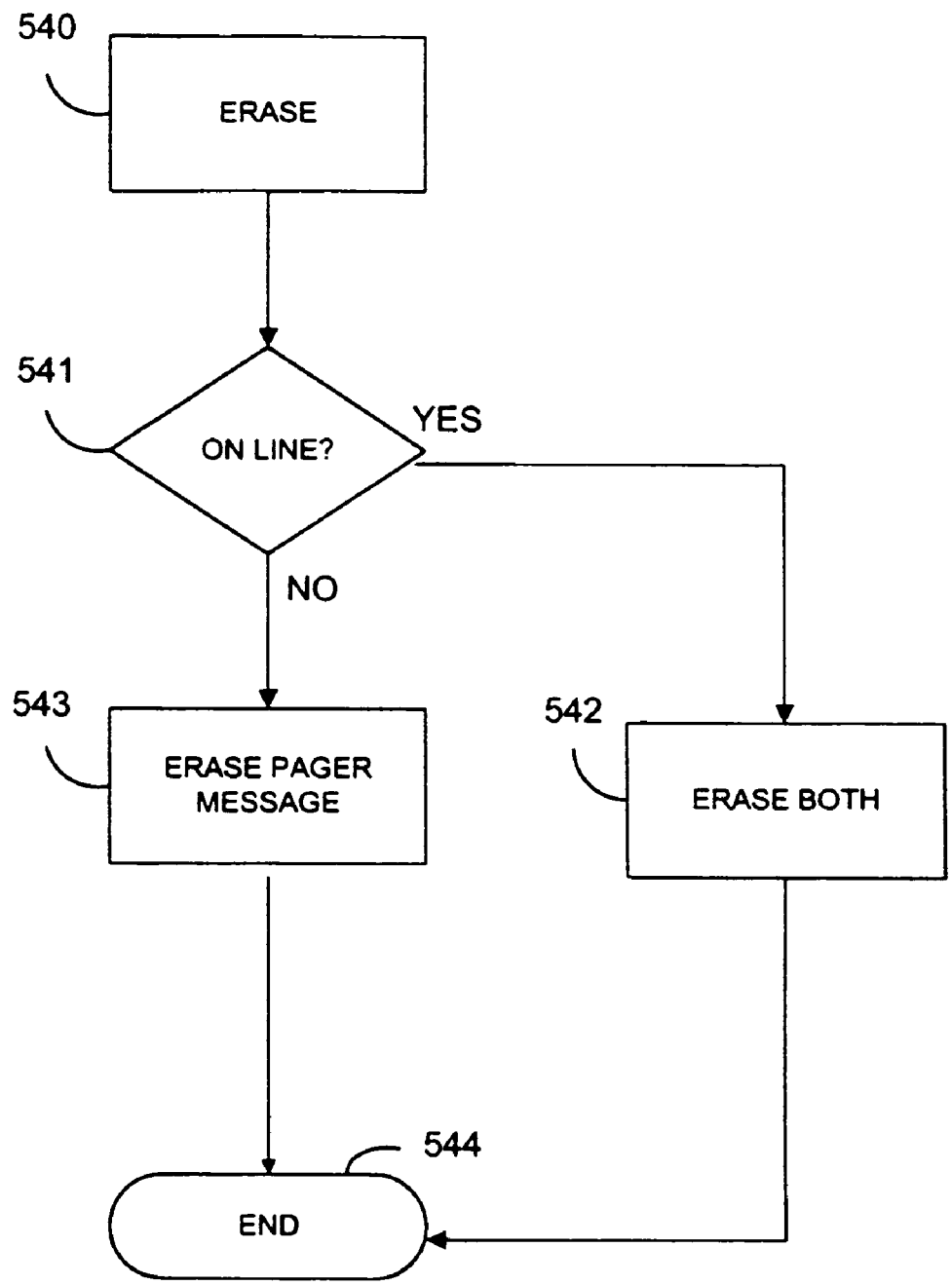
FIG. 8 is a flow diagram for a process according to a preferred embodiment of the present invention for erasing messages.

FIG. 8 shows process flow for when the user wishes to 'erase' messages using the interface. CPU 27 determines if the paging transceiver is on line or off line, step 541. If off line, flow proceeds to step 543 where the selected message is erased and the process ends, step 544. If at step 541, it is determined that the paging transceiver 100 is on line, the selected message at the paging transceiver (if any) and the corresponding message at the system 30 are both erased and the process ends, step 544.

Figure 9:
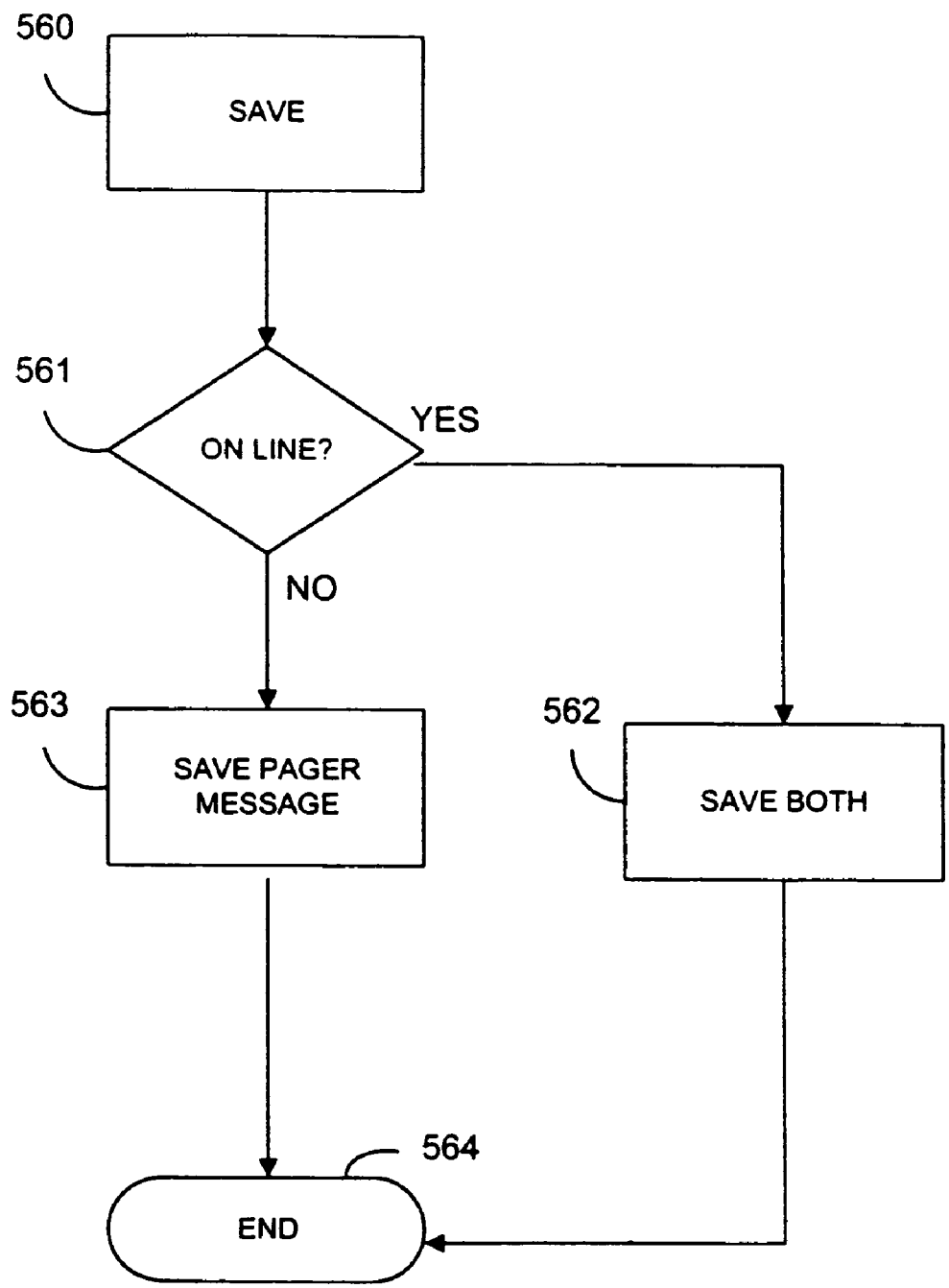
FIG. 9 is a flow diagram for a process according to a preferred embodiment of the present invention for saving messages.

FIG. 9 shows process flow where the user desires to 'save' messages. At step 560, flow proceeds to step 561 where it is determined if the paging transceiver 100 is on line or off line. If off line, a save message flag is set which corresponds to any selected message which may reside in the paging transceiver 100, step 563. If on line, flow proceeds to step 562 where the selected message is saved at the paging transceiver 100 (if any) and the system 30. If at step 562 the selected message does not reside at the paging transceiver 100, it will be retrieved from the system 30 and saved at both locations. The process ends at step 564.

Similar process flow may be implemented for other functionality which is desired in access and management of messages according to the present invention.

The foregoing disclosure is provided for purposes of explanation and illustration of various embodiments and features of the invention. Modifications and changes may be made to the disclosed subject matter without departing from the scope or spirit of the invention.

What is claimed is:

1. In a mobile cellular device that manages both locally stored and remotely stored voice messages, the mobile cellular device including a memory configured to store recorded voice messages, a transceiver configured to communicate with a remote system, and a user interface configured to enable selection of a recorded voice message indicator, a method carried out by the mobile cellular device comprising:
receiving via the user interface, input to play said selected recorded voice message;
reading from the memory of the mobile cellular device information pertaining to the selected recorded voice message;
determining whether said selected recorded voice message can be played without communicating with any remote system; and
playing said selected recorded voice message locally at the mobile cellular device if it is determined that said selected recorded voice message can be played without communicating with any remote system, and, if it is determined that the recorded voice message cannot be played without communicating with any remote system, then:
automatically establishing a connection with the remote system if a connection is not currently established between the transceiver and the remote system; and
transmitting a command message to the remote system to play said selected recorded voice message.

2. The method of claim 1, wherein the command message transmitted by the mobile cellular device to the remote system includes an information identifier that is used to retrieve the selected recorded voice message.

3. The method of claim 2, further comprising the mobile cellular device receiving the selected recorded voice message from the remote system after transmitting the command message to the remote system.

4. The method of claim 3, further comprising the mobile cellular device playing the recorded voice message and saving the recorded voice message in the memory as it is being received from the remote system.

5. The method of claim 4, further comprising:
the mobile cellular device receiving via the user interface an input to pause the playing of the audio information; and
in response to receiving the input, the mobile cellular device pausing the playing of the audio information while still continuing to receive the audio information from the remote system.

6. A mobile cellular device configured to manage recorded voice messages stored on the mobile cellular device and recorded voice messages stored in a remote system comprising:
a memory configured to store recorded voice messages;
a transceiver coupled to the memory configured to communicate with the remote system, and
a user interface coupled to the memory configured to enable selection of a voice message indicator, and further configured to receive input to play the voice message corresponding to the voice message indicator;
a processor configured to read from the memory of the mobile cellular device information pertaining to the selected recorded voice message and determine whether a selected recorded voice message can be played without communicating with any remote system;
the user interface configured to play said selected recorded voice message locally at the mobile cellular device if it is determined that said selected recorded voice message can be played without communicating with any remote system, and, if it is determined that the recorded voice message cannot be played without communicating with the remote system, then the mobile cellular device configured to automatically establish a connection with the remote system if a connection is not currently established between the transceiver and the remote system play said selected recorded voice message.

* * * * *